US012718439B2

(12) United States Patent
Kim et al.

(10) Patent No.: US 12,718,439 B2
(45) Date of Patent: Aug. 25, 2026

(54) FIRST ELECTRONIC DEVICE INCLUDING ARTIFICIAL INTELLIGENCE MODEL, METHOD FOR OPERATING THE SAME, AND SECOND ELECTRONIC DEVICE INCLUDING ARTIFICIAL INTELLIGENCE MODEL

(71) Applicant: Samsung Electronics Co., Ltd., Suwon-si (KR)

(72) Inventors: Dukhyun Kim, Suwon-si (KR); Sangheon Kim, Suwon-si (KR); Junsung Kim, Suwon-si (KR); Dongil Son, Suwon-si (KR); Yoechan Song, Suwon-si (KR); Yeunwook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 128 days.

(21) Appl. No.: 18/917,247

(22) Filed: Oct. 16, 2024

(65) Prior Publication Data

US 2025/0124627 A1 Apr. 17, 2025

Related U.S. Application Data

(63) Continuation of application No. PCT/KR2024/015627, filed on Oct. 15, 2024.

(30) Foreign Application Priority Data

Oct. 16, 2023 (KR) ........................ 10-2023-0137897
Nov. 20, 2023 (KR) ........................ 10-2023-0160018

(51) Int. Cl.
*G06T 11/60* (2026.01)
*G06F 3/04845* (2022.01)

(52) U.S. Cl.
CPC .......... *G06T 11/60* (2013.01); *G06F 3/04845* (2013.01)

(58) Field of Classification Search
CPC ..... G06T 11/60; G06F 3/04845; G06F 3/0481
(Continued)

(56) References Cited

U.S. PATENT DOCUMENTS 8,359,541 B1 1/2013 Landry
10,203,868 B2 * 2/2019 Bauer .................. G06F 3/0485
(Continued)

FOREIGN PATENT DOCUMENTS

KR 10-2011-0132031 A 12/2011
KR 10-2016-0069428 A 6/2016
(Continued)

OTHER PUBLICATIONS

Li et al. (2022), Computer Vision Foundation; CLIP-Event: Connecting Text and Images with Event Structures. Jan. 13, 2022.
(Continued)

*Primary Examiner* — David T Welch
(74) *Attorney, Agent, or Firm* — Jefferson IP Law, LLP

(57) ABSTRACT

A first electronic device is provided. The first electronic device includes a display, memory storing one or more computer programs, and one or more processors communicatively coupled to the display and the memory, wherein the one or more computer programs include computer-executable instructions that, when executed by the one or more processors individually or collectively, cause the first electronic device to enable the first electronic device to display, through the display, a first background image including a first object, and at least one indicator for executing at least one application on the first background image, identify whether the first object overlaps the at least one indicator, based on identifying that the first object overlaps the at least
(Continued)

one indicator, obtain a command to change at least one of a position, a size, or a shape of the first object, obtain a second object in which at least one of the position, the size, or the shape of the first object is changed in consideration of a position of the at least one indicator, based on first information about the first object and second information about the at least one indicator, using an artificial intelligence model stored in the memory, obtain a second background image in which the first object of the first background image is replaced with the second object, and display, through the display, the at least one indicator on the second background image, wherein the at least one indicator does not overlap the second object.

20 Claims, 14 Drawing Sheets

(58) Field of Classification Search
USPC .......................................................... 345/629
See application file for complete search history.

(56) References Cited

U.S. PATENT DOCUMENTS

2010/0226566 A1 9/2010 Luo et al.
2011/0119610 A1 5/2011 Hackborn et al.
2016/0041727 A1* 2/2016 Choi ....................... G06F 3/048 715/835
2016/0163052 A1 6/2016 Kim
2016/0307352 A1 10/2016 Ma et al.
2019/0155484 A1 5/2019 Chu
2019/0346994 A1* 11/2019 Bastide ................... G06F 3/013
2021/0367914 A1* 11/2021 Collins ................. G06F 16/447
2022/0174145 A1* 6/2022 Wilson .................. G06F 3/0482
2023/0102237 A1 3/2023 Jung et al.
2023/0115094 A1 4/2023 Zhu et al.
2023/0152956 A1 5/2023 Wang
2023/0237192 A1* 7/2023 Kahan ................. G06F 21/6245 726/1
2023/0259249 A1* 8/2023 Doken .................... G06F 3/013 715/765
2024/0221790 A1* 7/2024 Kang ................. H04N 21/8547
2024/0281110 A1* 8/2024 Chung .................... G06F 3/013
2024/0378695 A1 11/2024 Shin et al.
2025/0117992 A1* 4/2025 Cha ....................... G06F 3/0488

FOREIGN PATENT DOCUMENTS

KR 10-2266882 B1 6/2021
KR 10-2021-0156983 A 12/2021
KR 10-2486300 B1 1/2023
KR 10-2023-0098415 A 7/2023

OTHER PUBLICATIONS

International Search Report dated Jan. 14, 2025, issued in an International Application No. PCT/KR2024/015627.

* cited by examiner (a)

(b)

FIRST ELECTRONIC DEVICE INCLUDING ARTIFICIAL INTELLIGENCE MODEL, METHOD FOR OPERATING THE SAME, AND SECOND ELECTRONIC DEVICE INCLUDING ARTIFICIAL INTELLIGENCE MODEL

CROSS-REFERENCE TO RELATED APPLICATION(S)

This application is a continuation application, claiming priority under § 365(c), of an International application No. PCT/KR2024/015627, filed on Oct. 15, 2024, which is based on and claims the benefit of a Korean patent application number 10-2023-0137897, filed on Oct. 16, 2023, in the Korean Intellectual Property Office, and of a Korean patent application number 10-2023-0160018, filed on Nov. 20, 2023, in the Korean Intellectual Property Office, the disclosure of each of which is incorporated by reference herein in its entirety.

TECHNICAL FIELD

The disclosure relates to a first electronic device including an artificial intelligence (AI) model, a method for operating the same, and a second electronic device including an AI model.

BACKGROUND ART

The remarkable development of information and communication technology and semiconductor technology is a driving force behind a rapid increase in the proliferation and use of various types of electronic device. Electronic devices have been developed such that users may communicate while carrying them. An electronic device refers to a device that executes a specific function according to a loaded program, such as a mobile communication terminal, a tablet personal computer (PC), a video/audio device, a desktop/laptop computer, or a vehicle navigation device.

The electronic device may display a user-selected background image on a display. The electronic device may obtain the background image by downloading it through an Internet application, from an external electronic device, or using a camera. The electronic device may display an icon or widget for executing an application on the background image.

The above information is presented as background information only to assist with an understanding of the disclosure. No determination has been made, and no assertion is made, as to whether any of the above might be applicable as prior art with regard to the disclosure.

DISCLOSURE OF INVENTION

Solution to Problems

Aspects of the disclosure are to address at least the above-mentioned problems and/or disadvantages and to provide at least the advantages described below. Accordingly, an aspect of the disclosure is to provide a first electronic device including an AI model, a method for operating the same, and a second electronic device including an AI model.

Additional aspects will be set forth in part in the description which follows and, in part, will be apparent from the description, or may be learned by practice of the presented embodiments.

In accordance with an aspect of the disclosure, a first electronic device is provided. The first electronic device includes a display, memory storing one or more computer programs, and one or more processors communicatively coupled to the display and the memory, wherein the one or more computer programs include computer-executable instructions that, when executed by the one or more processors individually or collectively, cause the first electronic device to, display, through the display, a first background image including a first object, and at least one indicator for executing at least one application of the first electronic device on the first background image, identify whether the first object overlaps the at least one indicator. According to an embodiment, based on identifying that the first object overlaps the at least one indicator, obtain a command to change at least one of a position, a size, or a shape of the first object, based on providing first information about the first object and second information about the at least one indicator to an artificial intelligence model, obtain a second object in which at least one of the position, the size, or the shape of the first object is changed in consideration of a position of the at least one indicator, obtain a second background image in which the first object of the first background image is replaced with the second object, display, through the display, the at least one indicator on the second background image, wherein the at least one indicator does not overlap the second object.

In accordance with another aspect of the disclosure, a method performed by a first electronic device is provided. The method includes displaying, by the electronic device through a display included in the first electronic device, a first background image including a first object, and at least one indicator for executing at least one application of the first electronic device on the first background image, based on identifying that the first object overlaps the at least one indicator, obtaining, by the electronic device, a command to change at least one of a position, a size, or a shape of the first object, based on identifying that the first object overlaps the at least one indicator, obtaining, by the electronic device, an input to change at least one of a position, a size, or a shape of the first object, based on providing first information about the first object and second information about the at least one indicator to an artificial intelligence model, obtaining, by the electronic device, a second object in which at least one of the position, the size, or the shape of the first object is changed in consideration of a position of the at least one indicator, obtaining, by the electronic device, a changed second background image in which the first object of the first background image is replaced with the second object, obtaining, by the electronic device, a second background image in which the first object of the first background image is replaced with the second object, displaying, by the electronic device through the display, the at least one indicator on the second background image, wherein the at least one indicator does not overlap the second object.

In accordance with another aspect of the disclosure, one or more non-transitory computer-readable storage media storing one or more computer programs including computer-executable instructions that, when executed by one or more processors of a first electronic device individually or collectively, cause the electronic device to perform operations are provided. The operations include displaying, by the electronic device through a display included in the first electronic device, a first background image including a first object, and at least one indicator for executing at least one application of the first electronic device on the first background image, identifying, by the electronic device, whether the first object overlaps the at least one indicator, based on identifying that the first object overlaps the at least one indicator, obtaining, by the electronic device, a command to change at least one of a position, a size, or a shape of the first object, based on providing first information about the first object and second information about the at least one indicator to an artificial intelligence model, obtaining, by the electronic device, a second object in which at least one of the position, the size, or the shape of the first object is changed in consideration of a position of the at least one indicator, obtaining, by the electronic device, a second background image in which the first object of the first background image is replaced with the second object, and displaying, by the electronic device through the display, the at least one indicator on the second background image, wherein the at least one indicator does not overlap the second object.

In accordance with another aspect of the disclosure, a second electronic device is provided. The second electronic device includes communication circuitry, a display, memory storing one or more computer programs, one or more processors communicatively coupled to the communication circuitry, the display, and the memory, wherein the one or more computer programs include computer-executable instructions that, when executed by the one or more processors individually or collectively, cause the second electronic device to, obtain a first background image including a first object from a first electronic device through the communication circuitry, based on a user input to set the first background image as a background image of a home screen of the second electronic device, display the first background image as the background image of the home screen of the second electronic device, display at least one indicator for executing at least one application of the second electronic device on the first background image, identify whether the first object overlaps the at least one indicator, based on identifying that the first object overlaps the at least one indicator, obtain a command to change at least one of a position, a size, or a shape of the first object, based on providing first information about the first object and second information about the at least one indicator to an artificial intelligence model, obtain a second object in which at least one of the position, the size, or the shape of the first object is changed in consideration of a position of the at least one indicator, obtain a second background image in which the first object of the first background image is replaced with the second object, display, through the display, the at least one indicator on the second background image, wherein the at least one indicator does not overlap the second object.

In accordance with another aspect of the disclosure, a method for operating a second electronic device is provided. The method includes obtaining a first background image including a first object from a first electronic device through a communication circuit of the second electronic device.

According to an embodiment, the method for operating the second electronic device includes, based on a user input to set the first background image as a background image of a home screen of the second electronic device, displaying the first background image as the background image of the home screen of the second electronic device.

According to an embodiment, the method for operating the second electronic device includes displaying at least one indicator for executing at least one application on the first background image.

According to an embodiment, the method for operating the second electronic device includes identifying whether the at least one indicator overlaps the first object.

According to an embodiment, the method for operating the second electronic device includes, based on identifying that the at least one indicator overlaps the first object, obtaining a command to change at least one of a position, a size, or a shape of the first object.

According to an embodiment, the method for operating the second electronic device includes, based on providing first information about the first object and second information about the at least one indicator to an artificial intelligence model, obtaining a second object in which at least one of the position, the size, or the shape of the first object is changed in consideration of a position of the at least one indicator.

According to an embodiment, the method for operating the second electronic device includes obtaining a second background image in which the first object of the first background image is replaced with the second object.

According to an embodiment, the method for operating the second electronic device includes displaying, through the display, the at least one indicator on the second background image, wherein the at least one indicator does not overlap the second object.

According to an embodiment, a non-transitory computer-readable storage medium storing at least one instruction configured to, when executed by a processor of a second electronic device, enable the second electronic device to obtain a first background image including a first object from a first electronic device through a communication circuit of the second electronic device.

According to an embodiment, the non-transitory computer-readable storage medium storing at least one instruction configured to, when executed by the processor of the second electronic device, enable the second electronic device to, based on a user input to set the first background image as a background image of a home screen of the second electronic device, display the first background image as the background image of the home screen of the second electronic device.

According to an embodiment, the non-transitory computer-readable storage medium storing at least one instruction configured to, when executed by the processor of the second electronic device, enable the second electronic device to display at least one indicator for executing at least one application of the second electronic device on the first background image.

According to an embodiment, the non-transitory computer-readable storage medium storing at least one instruction configured to, when executed by the processor of the second electronic device, enable the second electronic device to identify whether the first object overlaps the at least one indicator.

According to an embodiment, the non-transitory computer-readable storage medium storing at least one instruction configured to, when executed by the processor of the second electronic device, enable the second electronic device to, based on identifying that the first object overlaps the at least one indicator, obtain a command to change at least one of a position, a size, or a shape of the first object.

According to an embodiment, the non-transitory computer-readable storage medium storing at least one instruction configured to, when executed by the processor of the second electronic device, enable the second electronic device to obtain first information about the first object and second information about the at least one indicator.

According to an embodiment, the non-transitory computer-readable storage medium storing at least one instruction configured to, when executed by the processor of the second electronic device, enable the second electronic device to, based on providing first information about the first object and second information about the at least one indicator to an artificial intelligence model, obtain a second object in which at least one of the position, the size, or the shape of the first object is changed in consideration of a position of the at least one indicator.

According to an embodiment, the non-transitory computer-readable storage medium storing at least one instruction configured to, when executed by the processor of the second electronic device, enable the second electronic device to obtain a second background image in which the first object of the first background image is replaced with the second object.

According to an embodiment, the non-transitory computer-readable storage medium storing at least one instruction configured to, when executed by the processor of the second electronic device, enable the second electronic device to display, through the display, the at least one indicator on the second background image, wherein the at least one indicator does not overlap the second object.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 1:
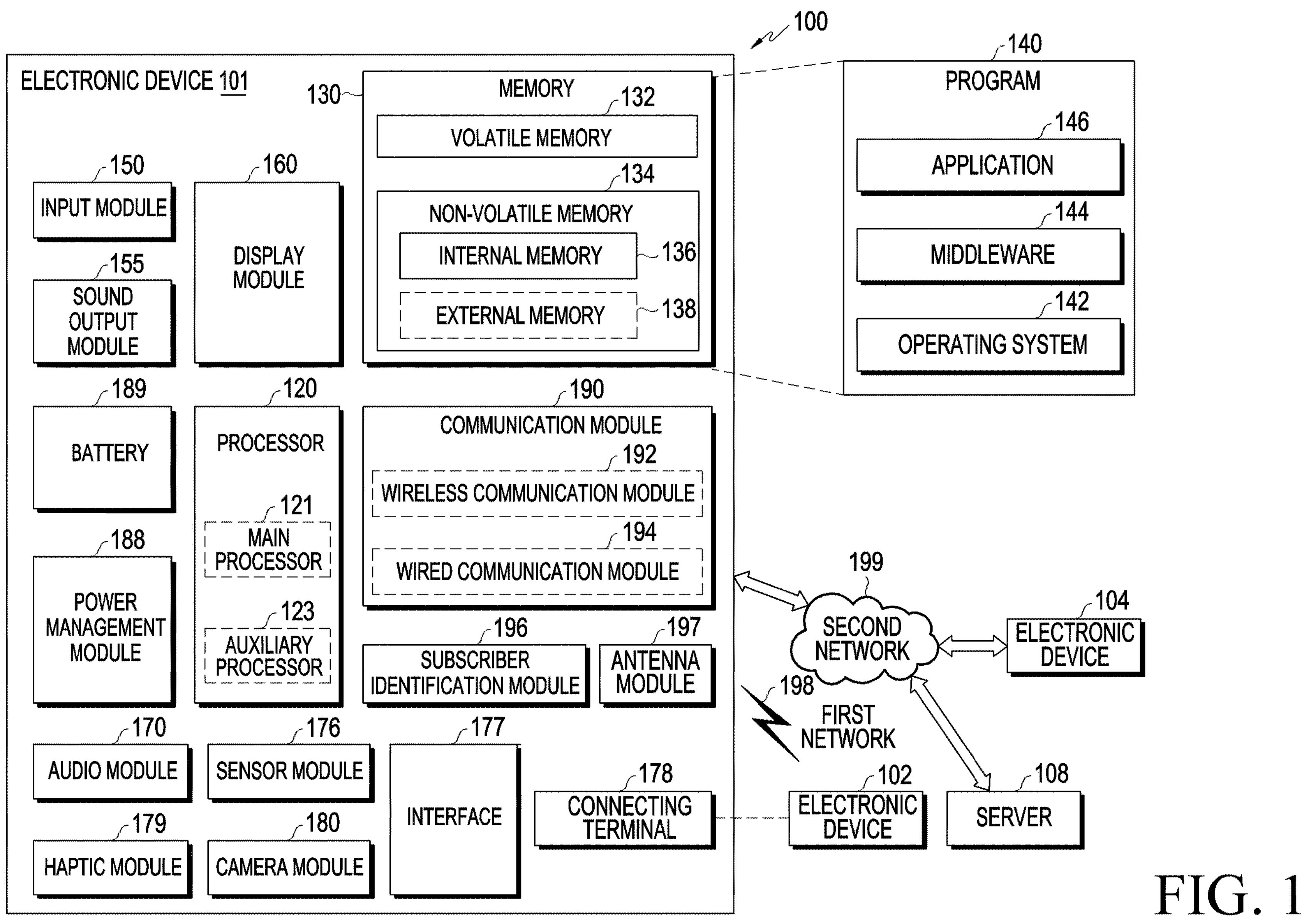
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the strength of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, is selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to an embodiment, the antenna module 197 may form an mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, requests the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
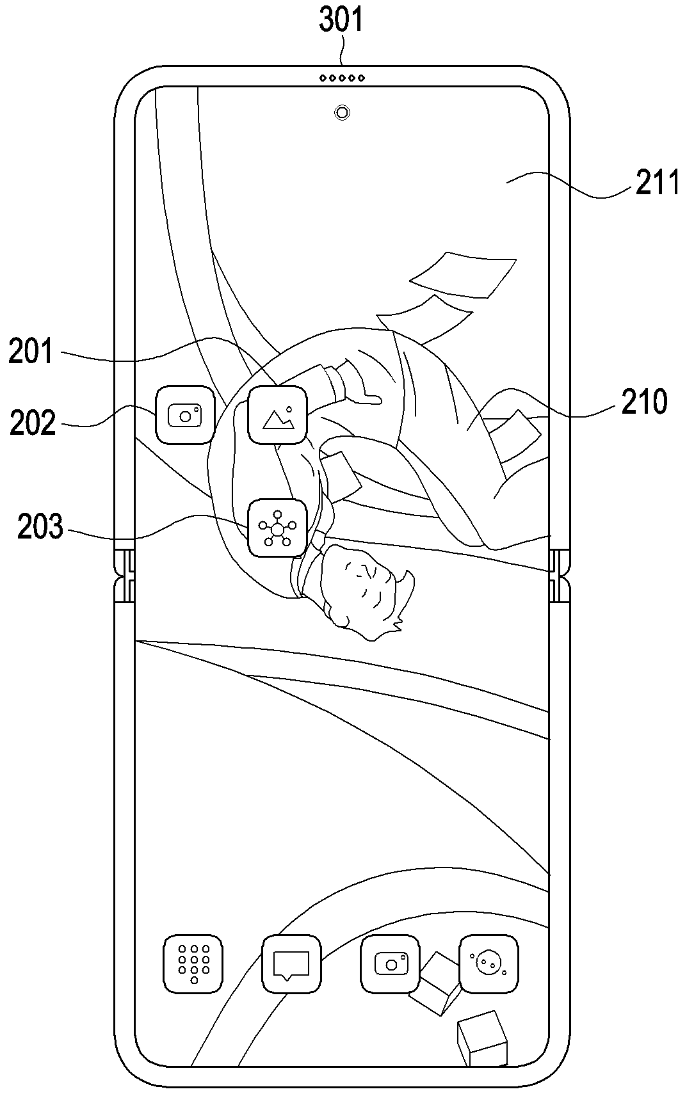
FIG. 2 is a diagram illustrating an operation for displaying a least one icon on a first background image by a first electronic device according to an embodiment of the disclosure.

FIG. 2 is a diagram illustrating an operation for displaying at least one icon on a first background image by a first electronic device according to an embodiment of the disclosure.

Referring to FIG. 2, according to an embodiment, a first electronic device 301 may set a first background image 211 as a background image of a user interface (e.g., home screen) provided by the first electronic device 301. For example, the first background image 211 includes an image stored in the first electronic device 301. For example, the first background image 211 includes at least one object (e.g., a first object 210). For example, the at least one object includes various types of content (e.g., a still image or a video) included in the background image. The first electronic device 301 may identify a user input to set the first background image as the background image of the home screen. According to an embodiment, the first electronic device 301 may display the first background image 211 as the background image of the user interface (e.g., home screen) provided by the first electronic device 301 based on the user input. For example, the home screen includes a screen that the first electronic device 301 displays, when identifying a user input to a home key provided by the first electronic device 301. For example, the home screen includes a screen displayed through a display, when a lock screen of the first electronic device 301 is unlocked and the display does not display an execution screen of an application installed on the first electronic device 301.

According to an embodiment, the first electronic device 301 may display, on the first background image 211, indicators for executing a plurality of applications stored in the first electronic device 301. According to an embodiment, the indicators may include icons 201, 202, and 203 and/or at least one widget for executing a specific function. For example, the first electronic device 301 displays, on the first background image 211, a first icon 201 for executing a first application, a second icon 202 for executing a second application, and a third icon 203 for executing a third application.

According to an embodiment, the first icon 201 and the third icon 203 may be displayed overlapping the first object 210 included in the first background image 211. According to an embodiment, the second icon 202 may be displayed without overlapping the first object 210. As the first icon 201 and the third icon 203 are displayed overlapping the first object 210 included in the first background image 211, a user of the first electronic device 301 may not accurately identify the first icon 201 and the third icon 203. Further, the shape of the first object 210 included in the first background image 211 may not be accurately identified either, which may make the first background image 211 less aesthetically pleasing.

When the first icon 201 and the third icon 203 are displayed overlapping the first object 210, a conventional electronic device may change the positions of the icons 201 and 203 or remove the icons 201 and 203 from the home screen. Alternatively, the conventional electronic device may set a new background image that does not overlap the first icon 201 and the third icon 203 as the background image of the home screen or change a ratio of the background image. However, the conventional electronic device may require an additional interaction with the user or may not allow the user to use a desired background image.

According to an embodiment, the first electronic device 301 may, using an artificial intelligence (AI) model, obtain a background image in which at least one of the size, position, or shape of the first object 210 is changed such that the first icon 201, the second icon 202, and the third icon 203 do not overlap the first object 210, and set the obtained background image as the background image of the user interface (e.g., home screen) provided by the first electronic device 301, without requiring an additional interaction with the user. Further, the first electronic device 301 may provide the user with a home screen that includes a user-desired background image, while ensuring the visibility of the icons 201, 202, and 203.

A detailed description will be given below of an operation for obtaining a second background image including a second object in which at least one of the size, position, or shape of the first object 210 is changed from the first background image 211 including the first object 210 by the first electronic device 301.

Figure 3A:
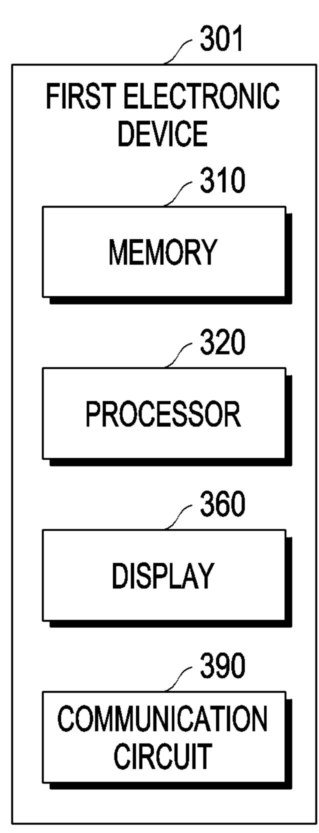
FIG. 3A is a block diagram illustrating a first electronic device according to an embodiment of the disclosure.

FIG. 3A is a block diagram illustrating a first electronic device according to an embodiment of the disclosure.

Referring to FIG. 3A, the first electronic device 301 may include memory 310, a processor 320, a display 360, and a communication circuit 390. According to an embodiment, the first electronic device 301 may be implemented to be identical or similar to the electronic device 101 of FIG. 1. For example, the first electronic device 301 is implemented as a smartphone, a tablet PC, or a computing device (e.g., a PC or a laptop). However, this is an example, and the first electronic device 301 may be implemented as various types of devices.

According to an embodiment, the processor 320 may provide overall control to an operation of the first electronic device 301. According to an embodiment, the processor 320 may be implemented to be identical or similar to the processor 120 in FIG. 1.

According to an embodiment, the processor 320 may identify a user input to set a first background image (e.g., the first background image in FIG. 2) including at least one object (e.g., the first object 210 in FIG. 2) as a background image of a home screen displayed through the display 360. According to an embodiment, the processor 320 may set or display the first background image as the background image of the home screen of the first electronic device 301 based on the user input. According to an embodiment, the processor 320 may display at least one indicator (e.g., an icon and a widget) on the first background image. For example, the processor 320 executes at least one corresponding application or specific function based on a user input to the at least one indicator. For example, the processor 320 displays at least one widget configured to execute a specific function provided by the first electronic device 301 on the first background image. For example, the processor 320 displays, on the first background image, at least one icon for executing at least one application of the first electronic device 301.

According to an embodiment, the processor 320 may identify whether the at least one icon overlaps the first object included in the first background image, after the first background image is displayed on the display 360 based on the user input. Depending on implementation, according to an embodiment, when identifying a command to set the first background image as the background image of the home screen of the first electronic device based on the user input (e.g., before displaying the first background image on the display 360), the processor 320 may also identify whether the first object included in the first background image is displayed overlapping the at least one icon while displaying the first background image. According to an embodiment, the description of at least one icon representing at least one application may be replaced with a description of at least one widget.

According to an embodiment, the processor 320 may identify the first object included in the first background image displayed on the home screen of the first electronic device 301. For example, the processor 320 identifies the first object included in the first background image using an AI model stored in the memory 310 (e.g., an AI model 340 in FIG. 3B). Alternatively, the processor 320 may identify the first object included in the first background image based on a preset object identification method.

According to an embodiment, the processor 320 may identify a display position (or arrangement position) of the first object and a display position (or arrangement position) of the at least one icon. According to an embodiment, the processor 320 may compare the display position of the first object with the display position of the at least one icon. According to an embodiment, the processor 320 may identify, based on a result of the comparison, whether the first object and the at least one icon are displayed overlapping.

According to an embodiment, the processor 320 may obtain a first command to change at least one of the position, size, or shape of the first object, based on identifying that the first object overlaps the at least one icon.

According to an embodiment, the processor 320 may change the position of an icon selected from the at least one icon by a user input. In doing so, the processor 320 may identify whether the icon at the changed position is displayed overlapping the first object. According to an embodiment, the processor 320 may obtain the first command based on identifying that the icon at the changed position overlaps the first object.

According to an embodiment, the processor 320 may further display a new icon on the home screen in addition to the at least one icon, based on a user input. In doing so, the processor 320 may identify whether the added icon is displayed overlapping the first object. According to an embodiment, the processor 320 may obtain the first command based on identifying that the added icon is displayed overlapping the first object.

According to an embodiment, when the aspect ratio of the first background image displayed on the display 360 is changed (e.g., the display 360 is changed from a landscape mode to a portrait mode or from the portrait mode to the landscape mode), the processor 320 may identify whether the at least one icon and the first object included in the first background image with the changed aspect ratio are displayed overlapping. According to an embodiment, the processor 320 may obtain the first command based on identifying that the at least one icon and the first object are displayed overlapping.

According to an embodiment, in the case where the display 360 is implemented as a flexible display, the processor 320 may change at least one of the size or ratio of the first background image displayed on the display 360 as an area of the display 360 expands or contracts. In doing so, the processor 320 may identify whether the at least one icon overlaps the first object included in the first background image with the at least one of the size or ratio changed. According to an embodiment, the processor 320 may obtain the first command based on identifying that the at least one icon overlaps the first object.

According to an embodiment, the processor 320 may obtain first information about the first object included in the first background image and second information about the at least one icon, in response to the first command. For example, the first information includes information about at least one of the position, size, or shape of the first object. The second information includes, for example, information about at least one of the position, size, or shape of the at least one icon.

According to an embodiment, the processor 320 may obtain a second object in which at least one of the position, size, or shape of the first object is changed such that the at least one icon and the first object do not overlap, using an object transfiguration module (e.g., 302 in FIG. 3B) stored in the memory 310. For example, the processor 320 obtains the second object by inputting the first information and the second information to the object transfiguration module 302.

According to an embodiment, the processor 320 may also obtain a user input (e.g., text input and/or voice input) that enables the user to change at least one of the position, size, or shape of the first object. For example, the user input includes information indicating how and/or by how much to change at least one of the position, size, or shape of the first object. According to an embodiment, when identifying the user input (e.g., text input and/or voice input), the processor 320 may obtain the first command. According to an embodiment, the processor 320 may obtain the second object in which at least one of the position, size, or shape of the first object is changed by inputting the first information, the second information, and the user input (e.g., text input and/or voice input) to the object transfiguration module 302 stored in the memory 310.

According to an embodiment, the processor 320 may obtain or generate a second background image in which the first object is replaced with the second object in the first background image. According to an embodiment, the processor 320 may display the at least one icon on the second background image. According to an embodiment, a display position of the second object and a display position of the at least one icon may not overlap.

According to an embodiment, the processor 320 may identify whether a region of interest (ROI) of the first object overlaps a plurality of indicators (e.g., an icon and a widget). According to an embodiment, when the first object included in the first background image is a human, the ROI may include a facial region representing a human face. For example, the ROI is a user-designated region of the first object included in the first background image. According to an embodiment, the processor 320 may also identify a user input that selects the ROI.

According to an embodiment, the processor 320 may obtain a second object in which at least one of the position, size, or shape of the first object is changed such that the ROI (e.g., facial region) of the first object does not overlap the plurality of indicators. In this case, the processor 320 may identify that a region of the first object other than the ROI may overlap at least one of the plurality of indicators.

Using the above method, the first electronic device 301 may display at least one icon on a background image with a minimal change in the shape of the background image as desired by the user. In this manner, the first electronic device 301 may provide a home screen that is aesthetically pleasing, while maintaining visibility for the user.

While the description of the disclosure focuses on a method for transforming an object included in a background image of a home screen by the first electronic device 301, this is exemplary, and the method of the disclosure is also applicable to a screen other than the home screen, provided by the first electronic device 301.

Figure 3B:
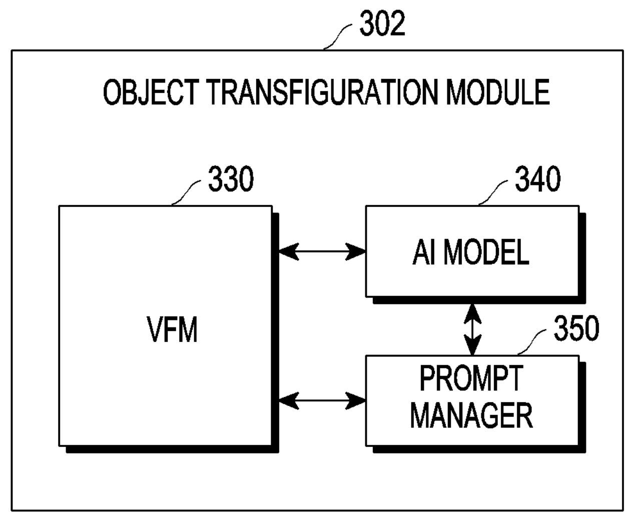
FIG. 3B is a block diagram illustrating an object transfiguration module in a first electronic device according to an embodiment of the disclosure.

FIG. 3B is a block diagram illustrating an object transfiguration module in a first electronic device according to an embodiment of the disclosure.

Referring to FIG. 3B, according to an embodiment, the object transfiguration module 302 may include a visual foundation model (VFM) 330, the AI model 340, and a prompt manager 350. According to an embodiment, the object transfiguration module 302 may be stored in the memory 310 (e.g., the memory 310 in FIG. 3A). According to an embodiment, the object transfiguration module 302 may be implemented in software. Depending on implementation, at least a portion of the object transfiguration module 302 may be implemented in hardware.

According to an embodiment, the processor 320 (e.g., the processor 320 in FIG. 3A) may obtain first information about the first object 210 (e.g., the first object 210 in FIG. 2) included in the first background image 211 (e.g., the first background image 211 in FIG. 2) that is to be set as the background image of the home screen, and second information about at least one icon (e.g., the at least one icon 201, 202, and 203 in FIG. 2) included in the home screen. For example, the first information includes information about at least one of the position, size, or shape of the first object 210. For example, the second information includes information about at least one of the position, size, or shape of the at least one icon 201, 202, and 203.

According to an embodiment, the VFM 330 may include information about a reference model for transforming an object of a specific shape. For example, the information about the reference model includes information about a Controlnet model, a stable diffusion model, a Pix2Pix model, a bootstrapping language-image pre-training for unified vision-language understanding and generation (BLIP) model, a contrastive language-image pre-training (CLIP) model, or a Detection model. However, these are exemplary, and the information about the reference model may not be limited to the above examples.

According to an embodiment, the prompt manager 350 may convert the first information and the second information into information (e.g., text information) that the AI model 340 is capable of processing. For example, the text information includes information (e.g., text) identifiable by the AI model 340. For example, based on the first information and the second information, the prompt manager 350 obtains text information indicating "a man in an O-shaped posture with his head facing downward, looking straight ahead and wearing a blue suit". For example, the prompt manager 350 obtains the text information indicating "a man in an O-shaped pose with his head facing downward, looking straight ahead and wearing a blue suit" based on the first information, using the CLIP model. Further, the prompt manager 350 may obtain information about any one of a shape, size, or position to which the first object 210 is to be changed (e.g., "Please change at least one of the shape, size, or position of a man in an O-shaped posture, with his head facing downward, looking straight ahead and wearing a blue suit so that it does not overlap the icon"), based on the text information. According to an embodiment, the prompt manager 350 may provide the obtained information to the AI model 340.

According to an embodiment, the AI model 340 may obtain a second object based on the information about the reference model included in the VFM 330 and the text information based on the first information and the second information. According to an embodiment, the second object may include an image in which a portion of the shape of the image representing the first object is changed or the size or position thereof is changed. For example, the second object includes an image representing "a man in a )-shaped posture with his head facing upward, looking straight ahead and wearing a blue suit".

Depending on implementation, the object transfiguration module 302 may not include the prompt manager 350. In this case, the AI model 340 may obtain the second object using the first information and the second information without the text information. That is, the AI model 340 may obtain the second object based on the information about the reference model included in the VFM 330, the first information, and the second information, without performing any conversion to text information.

According to an embodiment, the processor 320 may obtain a second background image in which the first object 210 is replaced with the second object in the first background image. According to an embodiment, the processor 320 may display the second background image as the background image of the home screen. According to an embodiment, the second object may be displayed without overlapping the at least one icon 201, 202, and 203 displayed on the home screen.

Depending on implementation, according to an embodiment, the processor 320 may identify a user input (e.g., text input and/or voice input) that enables the processor 320 to change at least one of the position, size, or shape of the first object. For example, the text input (or voice input) of the user includes text information indicating "Change the first object to a man in an M-shaped posture with his head facing downward, looking to the left and wearing a blue suit so that it does not overlap the icons displayed on the first background image."

According to an embodiment, the AI model 340 may obtain a third object including an image in which the shape of the first object is partially transformed or the size or position of the first object is changed in the image representing the first object, based on the information about the reference model included in the VFM 330, the information indicated by the user input (e.g., text input and/or voice input), and the text information. For example, the third object is the same as or different from the second object. For example, the third object includes an image representing "a man in an M-shaped posture with his head facing downward, looking to the left and wearing a blue suit".

According to an embodiment, the processor 320 may obtain a third background image in which the first object is replaced with the third object in the first background image. According to an embodiment, the processor 320 may display the third background image as the background image of the home screen. According to an embodiment, the third object may be displayed without overlapping the at least one icon 201, 202, and 203 displayed on the home screen.

While the VFM 330 is shown in FIG. 3B is included in the object transfiguration module 302, the technical spirit of the disclosure may not be limited thereto. For example, the VFM 330 is stored in a storage space (e.g., the memory 130) separate from the object transfiguration module 302.

In an embodiment, although the processor 320 is described as changing at least one of the position, size, or shape of the first object 210 included in the first background image 211, using the object transfiguration module 302, a separate server may also change at least one of the position, size, or shape of the first object 210 included in the first background image 211. For example, the server changes at least one of the position, size, or shape of the first object 210, using an AI model stored in the server and transmit an object changed from the first object 210 to the first electronic device 301. According to an embodiment, the processor 320 may obtain the object changed from the first object 210 from the server.

Operations of the first electronic device 301 described below with reference to the drawings may be performed by the processor 320. However, for ease of description, the operations performed by the processor 320 will be described as performed by the first electronic device 301.

Figure 4:
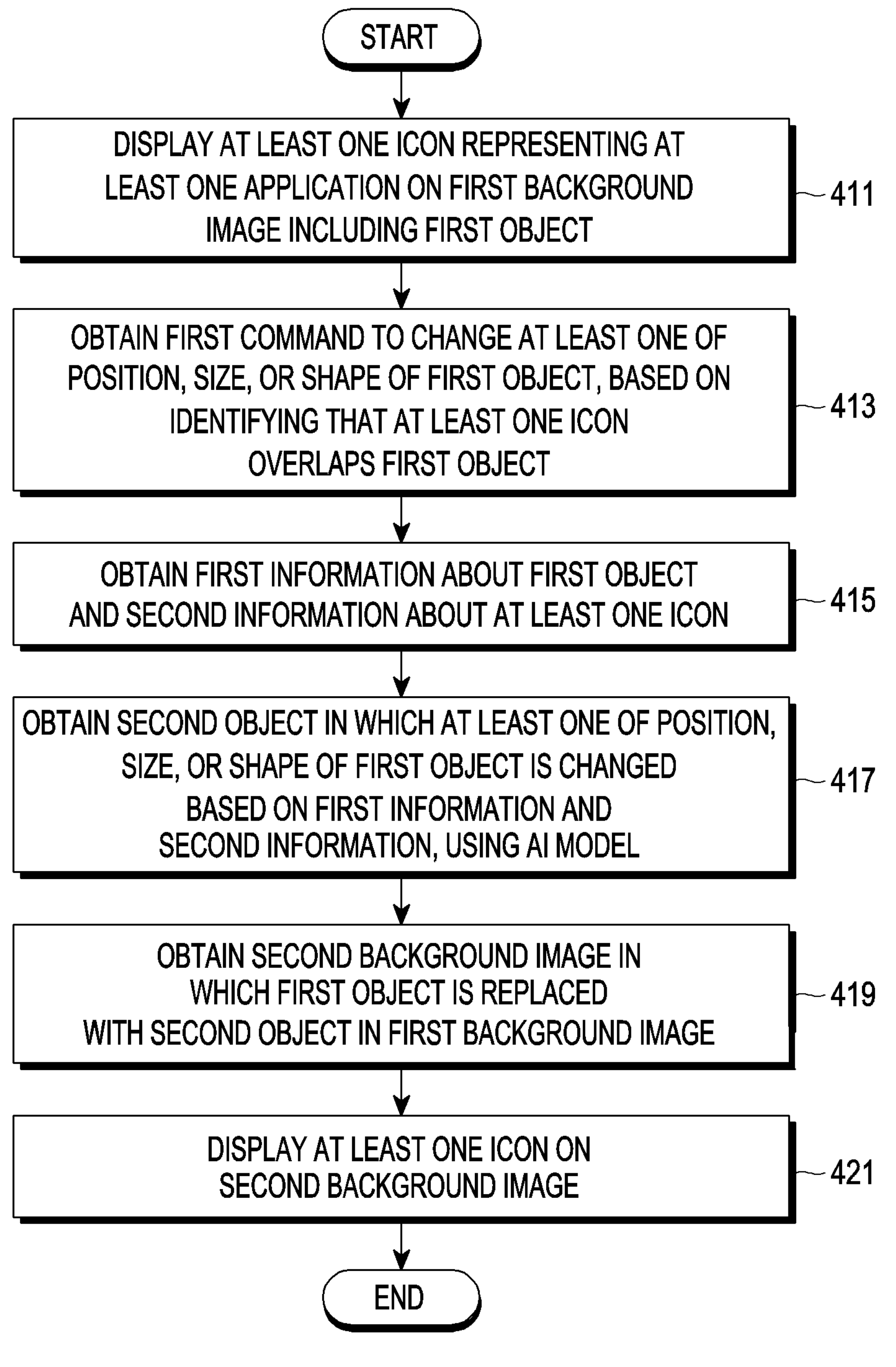
FIG. 4 is a flowchart illustrating an operation for obtaining a second background image by a first electronic device according to an embodiment of the disclosure.

FIG. 4 is a flowchart illustrating an operation for obtaining a second background image by a first electronic device according to an embodiment of the disclosure.

Referring to FIG. 4, according to an embodiment, in operation 411, the first electronic device 301 (e.g., the first electronic device 301 in FIG. 3A) may display at least one icon representing at least one application on a first background image including a first object. According to an embodiment, when identifying a user input to set the first background image as a background image of a home screen displayed through the display 360 (e.g., the display 360 in FIG. 3A) of the first electronic device 301, the first electronic device 301 may set or display the first background image as the background image of the home screen. For example, when a user input to a home key provided by the first electronic device 301 is identified, the home screen includes a screen displayed by the first electronic device 301. For example, the home screen includes a screen which is displayed through the display 360 when a lock screen of the first electronic device 301 is unlocked and an execution screen of an application installed on the first electronic device 301 is not displayed. According to an embodiment, the first electronic device 301 may display, on the first background image, at least one widget configured to execute a specific function provided by the first electronic device 301. According to an embodiment, a description of at least one icon representing at least one application may be replaced with a description of at least one widget.

According to an embodiment, in operation 413, the first electronic device 301 may obtain a first command to change at least one of the position, size, or shape of the first object based on identifying that the at least one icon and the first object are displayed overlapping. According to an embodiment, the first electronic device 301 may identify the position of the at least one icon and the position of the first object. According to an embodiment, the first electronic device 301 may identify whether the at least one icon and the first object overlap, based on the position of the at least one icon and the position of the first object. According to an embodiment, based on identifying that the at least one icon and the first object are displayed overlapping, the first electronic device 301 may obtain a first command to change at least one of the position, size, or shape of the first object such that the at least one icon and the first object are not displayed overlapping.

According to an embodiment, in operation 415, the first electronic device 301 may obtain first information about the first object included in the first background image and second information about the at least one icon, in response to the first command. According to an embodiment, the first information may include information about at least one of the position, size, or shape of the first object. According to an embodiment, the second information may include information about at least one of the position, size, or shape of the at least one icon.

According to an embodiment, in operation 417, the first electronic device 301 may obtain a second object in which at least one of the position, size, or shape of the first object is changed based on the first information and the second information, using the AI model 340 (e.g., the AI model 340 in FIG. 3B) stored in the memory 310 (e.g., the memory 310 in FIG. 3A).

According to an embodiment, the first electronic device 301 may display the second object in which the at least one of the position, size, or shape of the first object is changed through the display 360. According to an embodiment, the first electronic device 301 may obtain feedback information to change the first object to the second object or not to change the first object to the second object.

For example, when obtaining first feedback information to change the first object to the second object, the first electronic device 301 obtains a second background image in which the first object is replaced with the second object in the first background image.

For example, when obtaining second feedback information not to change the first object to the second object, the first electronic device 301 continues to display the first background image through the display 360 without obtaining the second background image.

For example, when obtaining the second feedback information not to change the first object to the second object, the first electronic device 301 obtains a third object different from the second object in which the at least one of the position, size, or shape of the first object is changed, based on the first and second information using the AI model 340. According to an embodiment, the third object may include an object that does not overlap the at least one icon. According to an embodiment, the first electronic device 301 may obtain feedback information to change the first object to the third object or not to change the first object to the third object. According to an embodiment, based on the feedback information, the first electronic device 301 may obtain a third background image in which the first object is replaced with the third object in the first background image, continue to display the first background image, or obtain a fourth object which is different from the second object in which at least one of the position, size, or shape of the first object is changed and different the third object, using the AI model 340.

According to an embodiment, in operation 419, the first electronic device 301 may obtain the second background image in which the first object is replaced with the second object in the first background image.

According to an embodiment, in operation 421, the first electronic device 301 may display the at least one icon on the second background image. According to an embodiment, the at least one icon may be displayed without overlapping the second object.

According to an embodiment, the first information about the first object and the second information about the at least one icon may be obtained between operation 411 and operation 413. That is, the first electronic device 301 may identify whether the at least one icon and the first object are displayed overlapping, after obtaining the first information and the second information.

Figure 5A:
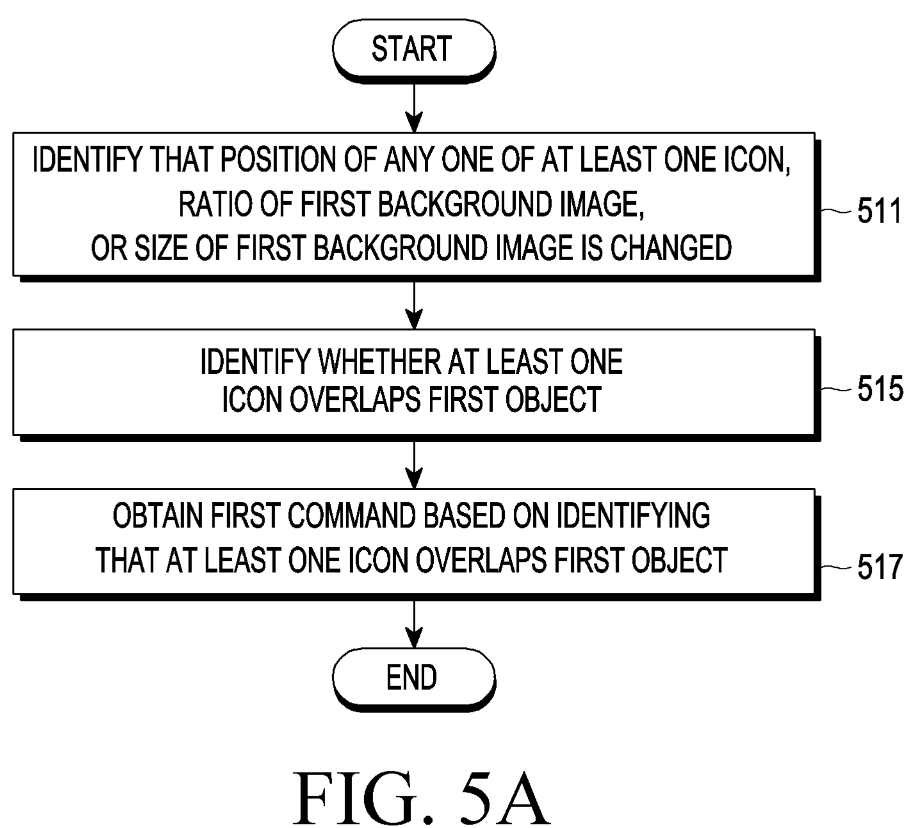
FIG. 5A is a flowchart illustrating an operation for obtaining a first command to change a first object included in a first background image by a first electronic device according to an embodiment of the disclosure.

FIG. 5A is a flowchart illustrating an operation for obtaining a first command to change a first object included in a first background image by the first electronic device 301 according to an embodiment of the disclosure.

Referring to FIG. 5A, according to an embodiment, in operation 511, the first electronic device 301 (e.g., the first electronic device 301 in FIG. 3A) may identify that the position of any one of at least one icon, the aspect ratio of a first background image displayed through the display 360 (e.g., the display 360 in FIG. 3A), or the size of the first background image is changed.

For example, based on a user input to change the position of any one of the at least one icon, the first electronic device 301 changes the position of the icon. For example, the first electronic device 301 changes the aspect ratio of the first background image, based on a command to switch from a portrait mode to a landscape mode or from the landscape mode to the portrait mode according to rotation of the first electronic device 301. For example, when the display 360 is implemented as a flexible display, the first electronic device 301 changes the aspect ratio or size of the first background image displayed on the display 360, as the area of the display 360 expands or contracts.

According to an embodiment, the first electronic device 301 may further display a new icon on a home screen based on a user input, in addition to the at least one icon. The first electronic device 301 may identify whether the added icon and the first object are displayed overlapping. According to an embodiment, the first electronic device 301 may obtain a first command based on identifying that the added icon and the first object are displayed overlapping.

According to an embodiment, in operation 515, the first electronic device 301 may identify whether the at least one icon and the first object are displayed overlapping. According to an embodiment, the first electronic device 301 may identify whether the at least one icon and the first object are displayed overlapping, based on the position of the at least one icon and the position of the first object.

According to an embodiment, in operation 517, the first electronic device 301 may obtain a first command based on identifying that the at least one icon and the first object are displayed overlapping. According to an embodiment, the first command may include a command to change at least one of the position, size, or shape of the first object.

Figure 5B:
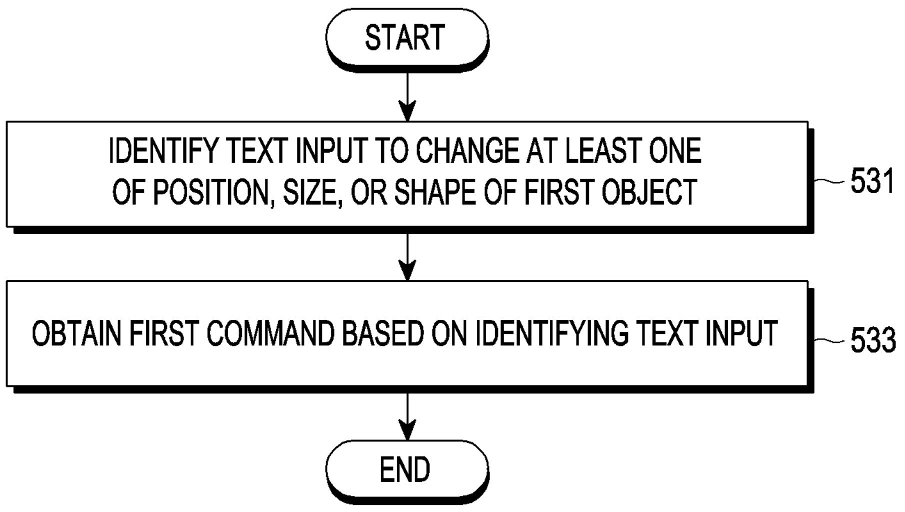
FIG. 5B is a flowchart illustrating an operation for obtaining a first command to change a first object included in a first background image by a first electronic device according to an embodiment of the disclosure.

FIG. 5B is a flowchart illustrating an operation for obtaining a first command to change a first object included in a first background image by a first electronic device according to an embodiment of the disclosure.

Referring to FIG. 5B, according to an embodiment, in operation 531, the first electronic device 301 (e.g., the first electronic device 301 in FIG. 3A) may identify a user input (e.g., text input and/or voice input) to change at least one of the position, size, or shape of a first object included in a first background image. For example, the first object is an object representing "a man in an O-shaped posture with his head facing downward, looking straight ahead and wearing a blue suit." For example, the text or voice input of the user indicates, "Change the first object to a man in a )-shaped posture with his head facing upward, looking to the right and wearing a green suit, so that it does not overlap the icon displayed on the first background image."

According to an embodiment, in operation 533, the first electronic device 301 may obtain the first command based on identifying the user input (e.g., text input and/or voice input).

Figure 6:
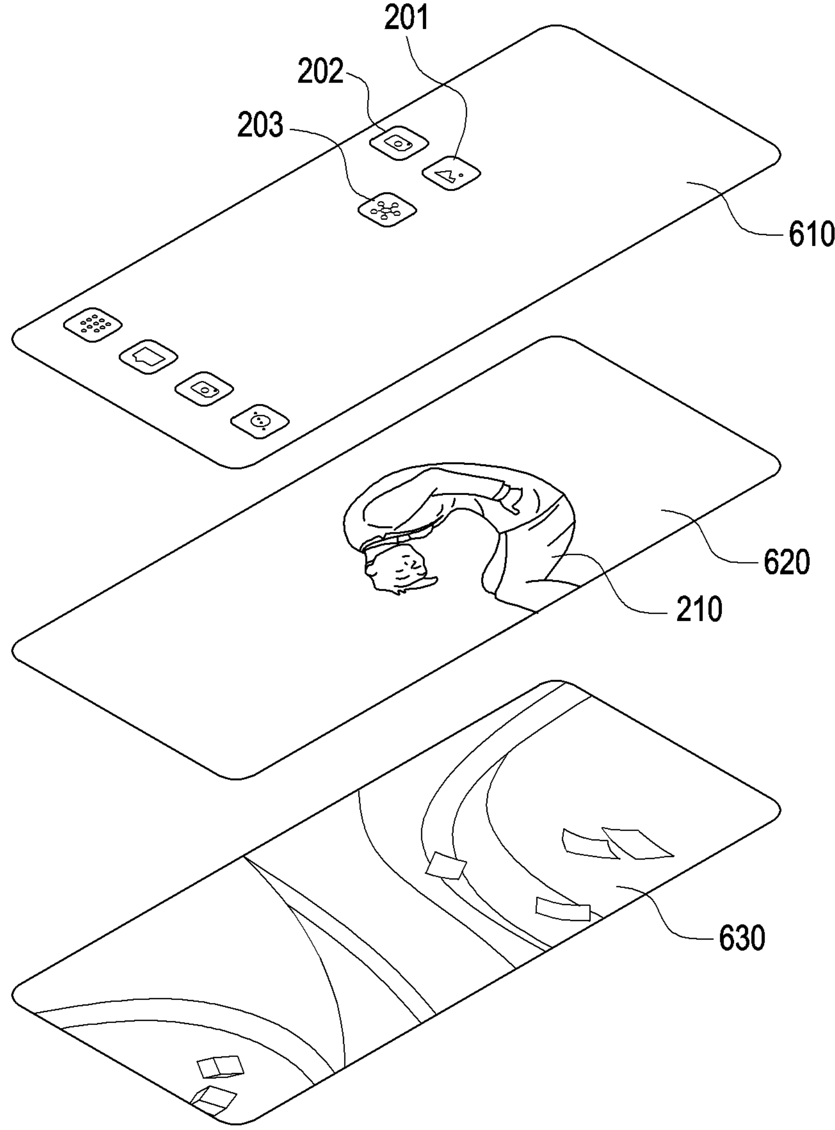
FIG. 6 is a diagram illustrating an operation for identifying whether a first object and at least one icon are displayed overlapping by a first electronic device according to an embodiment of the disclosure.

FIG. 6 is a diagram illustrating an operation for identifying whether a first object and at least one icon are displayed overlapping by a first electronic device according to an embodiment of the disclosure.

Referring to FIG. 6, according to an embodiment, the first electronic device 301 (e.g., the first electronic device 301 in FIG. 3A) may obtain (or identify) the first object 210 included in the first background image 211 (e.g., the first background image 211 in FIG. 2) from the first background image 211 displayed on the home screen of the first electronic device 301, using the AI model 340 (e.g., the AI model 340 in FIG. 3B) stored in the memory 310 (e.g., the memory 310 in FIG. 3A). Alternatively, the processor 320 may identify the first object included in the first background image based on a preset object identification method. According to an embodiment, the first electronic device 301 may obtain a layer 620 including the first object 210. The size of the layer 620 may be equal to the size of the first background image 211 displayed on the display 360 (e.g., the display 360 in FIG. 3A).

According to an embodiment, the first electronic device 301 may obtain a layer for the remaining portion of the first background image 211 except for the first object 210. According to an embodiment, the first electronic device 301 may obtain a layer 630 in which a portion with the first object 210 excluded therefrom is in-painted based on a layer for the remaining portion of the first background image 211 except for the first object 210. The size of the layer 630 in which the portion with the first object 210 excluded therefrom is in-painted may be equal to the size of the first background image 211.

According to an embodiment, the first electronic device 301 may obtain a layer 610 including the first icon 201, the second icon 202, and the third icon 203 displayed on the home screen of the first electronic device 301. The size of the layer 610 may be equal to the size of the first background image 211.

According to an embodiment, the first electronic device 301 may identify the position of the first icon 201, the position of the second icon 202, and the position of the third icon 203. For example, the first electronic device 301 identifies coordinates corresponding to the first icon 201, coordinates corresponding to the second icon 202, and coordinates corresponding to the third icon 203.

According to an embodiment, the first electronic device 301 may identify the position of the first object 210. For example, the first electronic device 301 identifies the coordinates corresponding to the first object 210.

According to an embodiment, the first electronic device 301 may identify whether the position of the first icon 201 overlaps the position of the first object 210. According to an embodiment, the first electronic device 301 may identify whether the position of the second icon 202 overlaps the position of the first object 210. According to an embodiment, the first electronic device 301 may identify whether the position of the third icon 203 overlaps the position of the first object 210.

Figure 7:
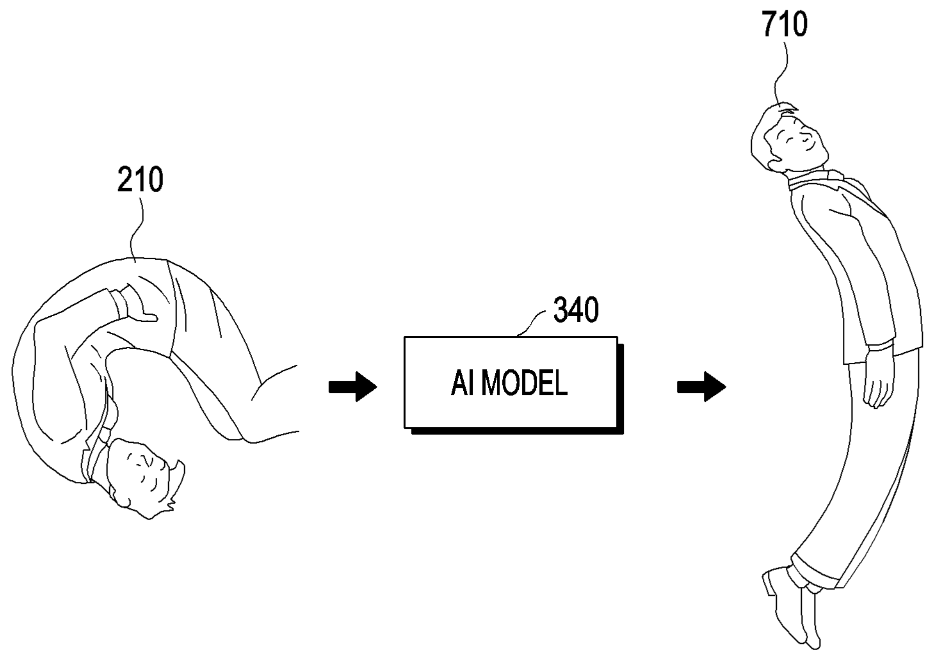
FIG. 7 is a diagram illustrating an operation for obtaining a second object from a first object using an artificial intelligence (AI) model by a first electronic device according to an embodiment of the disclosure.

FIG. 7 is a diagram illustrating an operation for obtaining a second object from a first object using an AI model by a first electronic device according to an embodiment of the disclosure.

Referring to FIG. 7, according to an embodiment, the first electronic device 301 (e.g., the first electronic device 301 in FIG. 3A) may display, through the display 360 (e.g., the display 360 in FIG. 3A), at least one icon for executing at least one application on the first background image 211 (e.g., the first background image 211 in FIG. 2) including the first object 210 (e.g., the first object 210 in FIG. 2).

According to an embodiment, the first electronic device 301 may identify that the at least one icon overlaps the first object 210. According to an embodiment, the first electronic device 301 may obtain a first command to change at least one of the position, size, or shape of the first object 210 to prevent the first object 210 and the at least one icon from being displayed overlapping.

According to an embodiment, the first electronic device 301 may identify first information including at least one of the shape, size, or position of the first object 210 based on the command. According to an embodiment, the first electronic device 301 may identify second information including at least one of a shape, size, or position of the at least one icon, based on the first command.

According to an embodiment, the first electronic device 301 may extract (or obtain) the first object 210 from the first background image. According to an embodiment, the first object 210 may represent an image. For example, the first object 210 includes an image representing "a man in an O-shaped posture with his head facing downward, looking straight ahead and wearing a blue suit."

According to an embodiment, the first electronic device 301 may obtain a second object 710 in which at least one of the shape, size, or position of the first object 210 is changed based on the first information, the second information, and information about a reference model included in the VFM 330 (e.g., the VFM 330 in FIG. 3B), using the AI model 340 (e.g., the AI model 340 in FIG. 3A) stored in the memory 310 (e.g., the memory 310 in FIG. 3A). According to an embodiment, the second object 710 may represent an image. For example, the second object 710 includes an image representing "a man in a )-shaped posture with his head facing upward, looking straight ahead and wearing a blue suit."

Figure 8A:
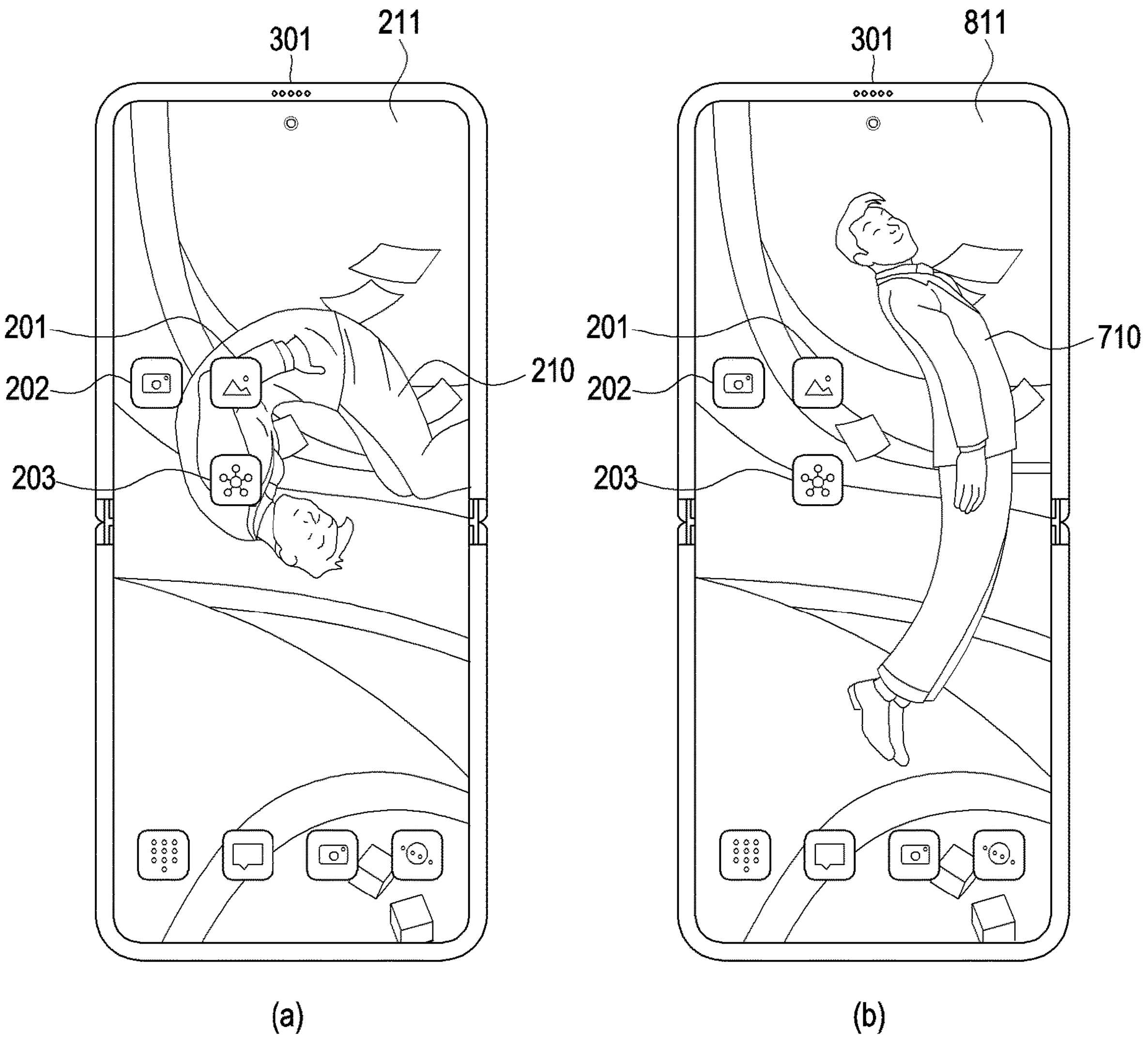
FIG. 8A is a diagram illustrating an operation for obtaining a second background image in which a first object is replaced with a second object by a first electronic device according to an embodiment of the disclosure.

FIG. 8A is a diagram illustrating an operation for obtaining a second background image in which a first object is replaced with a second object by a first electronic device according to an embodiment of the disclosure.

Referring to part (a) of FIG. 8A, according to an embodiment, the first electronic device 301 (e.g., the first electronic device 301 in FIG. 3A) may display the first icon 201, the second icon 202, and the third icon 203 on the first background image 211 through the display 360 (e.g., the display 360 in FIG. 3A).

According to an embodiment, the first electronic device 301 may identify the position of the first icon 201, the position of the second icon 202, the position of the third icon 203, and the position of the first object 210 included in the first background image 211.

According to an embodiment, the first electronic device 301 may compare the position of the first object 210 with the position of the first icon 201, the position of the second icon 202, and the position of the third icon 203.

According to an embodiment, the first electronic device 301 may identify that the first icon 201 and the first object 210 are displayed overlapping. According to an embodiment, the first electronic device 301 may identify that the third icon 203 and the first object 210 are displayed overlapping. According to an embodiment, the first electronic device 301 may identify that the second icon 202 and the first object 210 are displayed without overlapping.

According to an embodiment, based on identifying that the first icon 201 and the third icon 203 are displayed overlapping the first object 210, the first electronic device 301 may identify a command to change at least one of the position, size, or shape of the first object 210 such that the first icon 201, the second icon 202, and the third icon 203 are displayed without overlapping the first object 210.

Referring to part (b) of FIG. 8A, according to an embodiment, the first electronic device 301 may obtain a second object 710 in which the size, position, and shape of the first object 210 are changed, using the AI model 340 (e.g., the AI model 340 in FIG. 3B). According to an embodiment, the first electronic device 301 may obtain a second background image 811 in which the first object 210 is replaced with the second object 710. For example, the second object 710 includes an image representing "a man in a )-shaped posture with his head facing upward, looking straight ahead and wearing a blue suit."

According to an embodiment, the first electronic device 301 may display the second background image 811 through the display 360. According to an embodiment, the first electronic device 301 may display the first icon 201, the second icon 202, and the third icon 203 on the second background image 811. According to an embodiment, the second object 710 may not be displayed overlapping the first icon 201, the second icon 202, and the third icon 203.

Figure 8B:
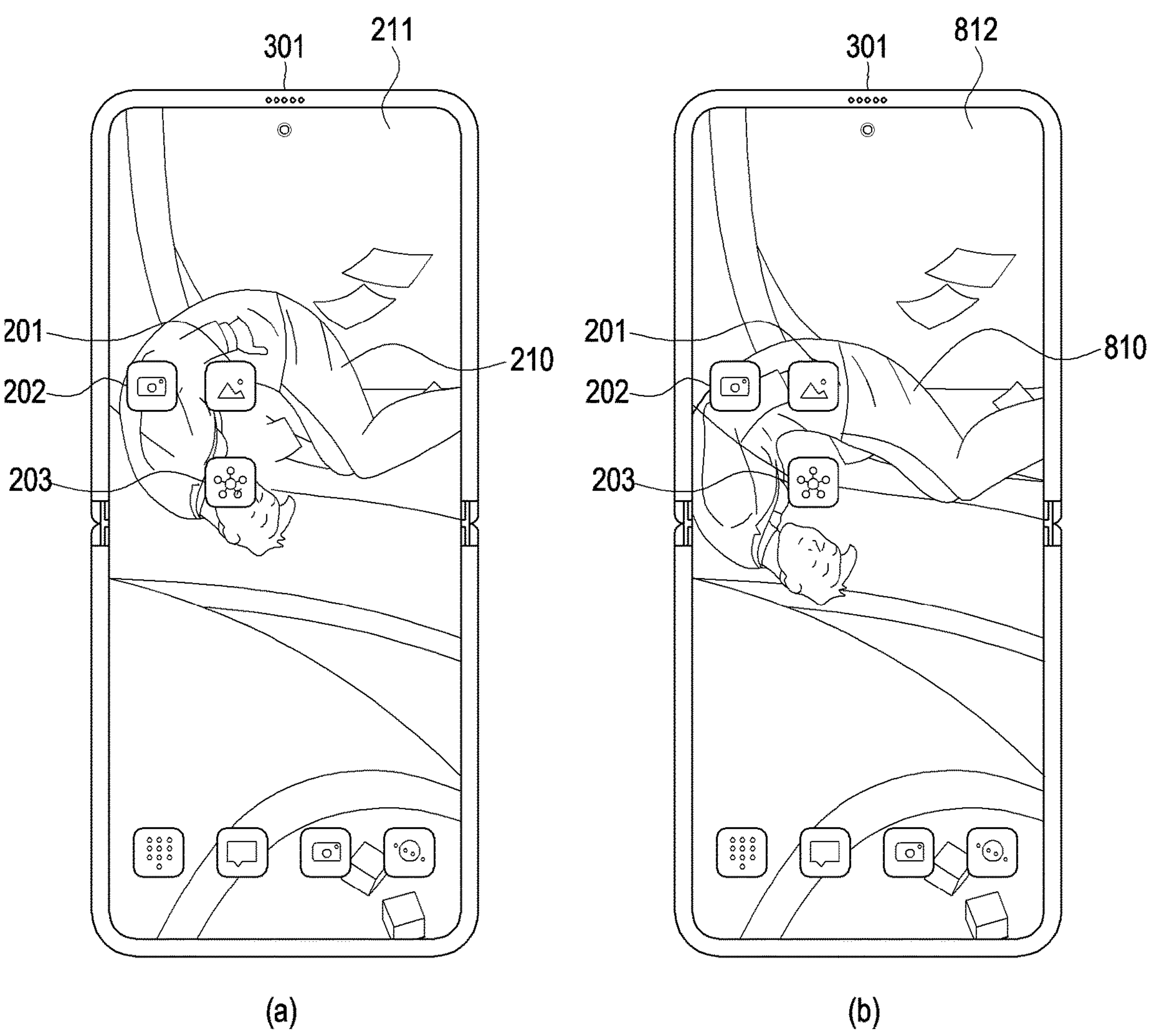
FIG. 8B is a diagram illustrating an operation for obtaining a second background image in which a first object is replaced with a second object by a first electronic device according to an embodiment of the disclosure.

FIG. 8B is a diagram illustrating an operation for obtaining a second background image in which a first object replaced with a second object by a first electronic device according to an embodiment of the disclosure.

Referring to part (a) of FIG. 8B, according to an embodiment, the first electronic device 301 (e.g., the first electronic device 301 in FIG. 3A) may display the first icon 201, the second icon 202, and the third icon 203 on the first background image 211 through the display 360 (e.g., the display 360 in FIG. 3A).

According to an embodiment, the first electronic device 301 may identify whether an ROI of the first object 210 overlaps the first icon 201, the second icon 202, and the third icon 203. For example, when the object included in the background image is a human, the ROI includes a facial region of a human. For example, the ROI is a user-designated region of the object included in the background image. According to an embodiment, the first electronic device 301 may identify a user input to select the ROI of the first object 210.

According to an embodiment, the first electronic device 301 may identify that the ROI of the first object 210 included in the first background image 211 is a facial region representing a human face.

According to an embodiment, the first electronic device 301 may identify the position of the first icon 201, the position of the second icon 202, the position of the third icon 203, and the position of the first object 210 included in the first background image 211. According to an embodiment, the first electronic device 301 may compare the position of the first object 210 with the position of the first icon 201, the position of the second icon 202, and the position of the third icon 203. According to an embodiment, the first electronic device 301 may identify that the ROI of the first object 210 overlaps the third icon 203, based on a result of the comparison.

According to an embodiment, based on identifying that the third icon 203 overlaps the facial region of the first object 210, the first electronic device 301 may identify a command to change at least one of the position, size, or shape of the first object 210 such that the third icon 203 does not overlap the facial region of the first object 210.

Referring to part (b) of FIG. 8B, according to an embodiment, the first electronic device 301 may obtain a second object 810 in which the size, position, and shape of the first object 210 are changed, using the AI model 340 (e.g., the AI model 340 in FIG. 3B). According to an embodiment, the first electronic device 301 may obtain a second background image 812 in which the first object 210 is replaced with the second object 810.

According to an embodiment, the first electronic device 301 may display the second background image 812 through the display 360. According to an embodiment, the first electronic device 301 may display the first icon 201, the second icon 202, and the third icon 203 on the second background image 812. According to an embodiment, the facial region of the second object 810 may be displayed without overlapping the first icon 201, the second icon 202, and the third icon 203.

Figure 9:
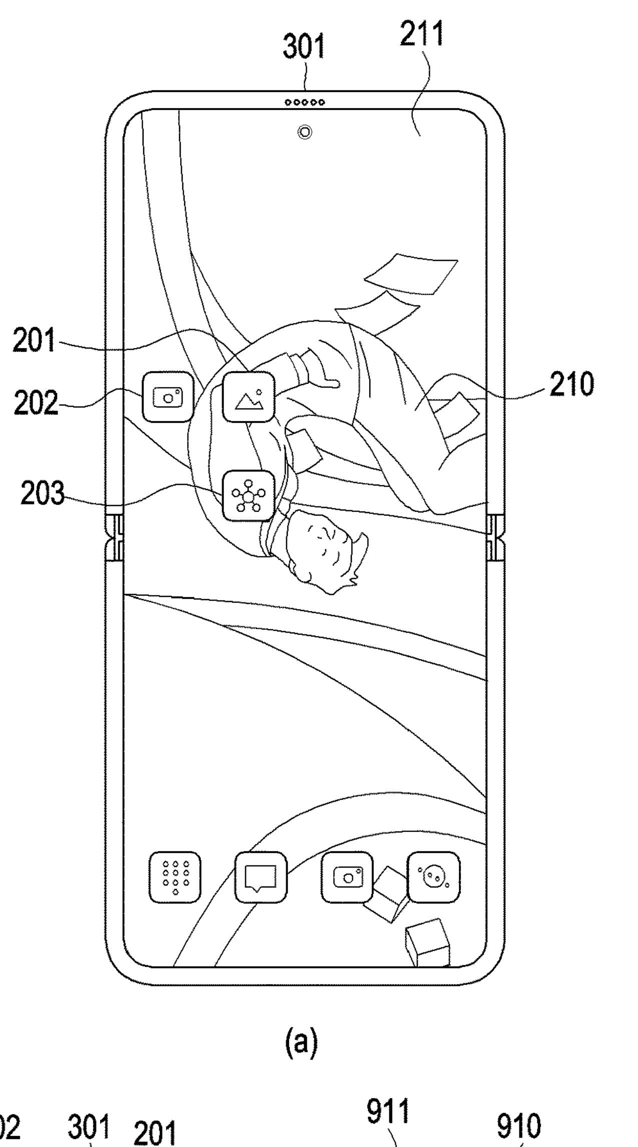
FIG. 9 is a diagram illustrating an operation for obtaining a first command by a first electronic device, when the aspect ratio of a first background image changes according to an embodiment of the disclosure.
Figure 9:
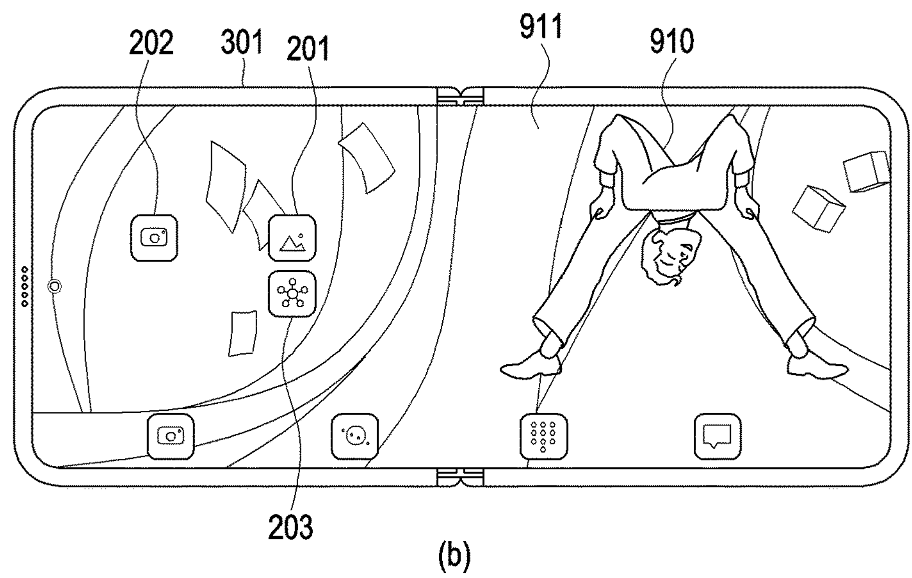

FIG. 9 is a diagram illustrating an operation for obtaining a first command by a first electronic device, when the aspect ratio of a first background image is changed, according to an embodiment of the disclosure.

Referring to part (a) of FIG. 9, according to an embodiment, the first electronic device 301 (e.g., the first electronic device 301 in FIG. 3A) may display the first icon 201, the second icon 202, and the third icon 203 on the first background image 211 through the display 360 (e.g., the display 360 in FIG. 3A).

According to an embodiment, the first electronic device 301 may change the aspect ratio of the first background image 211 displayed on the display 360 based on the first electronic device 301 changing from the portrait mode to the landscape mode.

Referring to part (b) of FIG. 9, according to an embodiment, the first electronic device 301 may identify whether the first object 210 is displayed overlapping the first icon 201, the second icon 202, and the third icon 203 based on the change of the aspect ratio of the first background image 211.

According to an embodiment, the first electronic device 301 may identify the position of the first icon 201, the position of the second icon 202, the position of the third icon 203, and the position of the first object 210 included in the first background image 211, which are to be displayed through the display 360.

According to an embodiment, the first electronic device 301 may compare the position of the first icon 201 with the position of the first object 210, compare the position of the second icon 202 with the position of the first object 210, and compare the position of the third icon 203 with the position of the first object 210.

According to an embodiment, the first electronic device 301 may identify that the first icon 201 and the first object 210 are displayed overlapping, based on a result of the comparison. According to an embodiment, the first electronic device 301 may identify that the third icon 203 and the first object 210 are displayed overlapping, based on a result of the comparison. According to an embodiment, the first electronic device 301 may identify that the second icon 202 and the first object 210 are displayed without overlapping, based on a result of the comparison.

According to an embodiment, the first electronic device 301 may identify a command to change at least one of the position, size, or shape of the first object 210 such that the first icon 201, the second icon 202, and the third icon 203 do not overlap the first object 210.

According to an embodiment, the first electronic device 301 may obtain a third object 910 in which the position, size, and shape of the first object 210 are changed, using the AI model 340 (e.g., the AI model 340 in FIG. 3B). According to an embodiment, the first electronic device 301 may obtain a third background image 911 in which the first object 210 is replaced with the third object 910. For example, the third object 910 includes an image representing "a man in an M-shaped posture with his head facing downward, looking to the left and wearing a blue suit."

According to an embodiment, the first electronic device 301 may display the third background image 911 through the display 360. According to an embodiment, the first electronic device 301 may display the first icon 201, the second icon 202, and the third icon 203 on the third background image 911.

Figure 10:
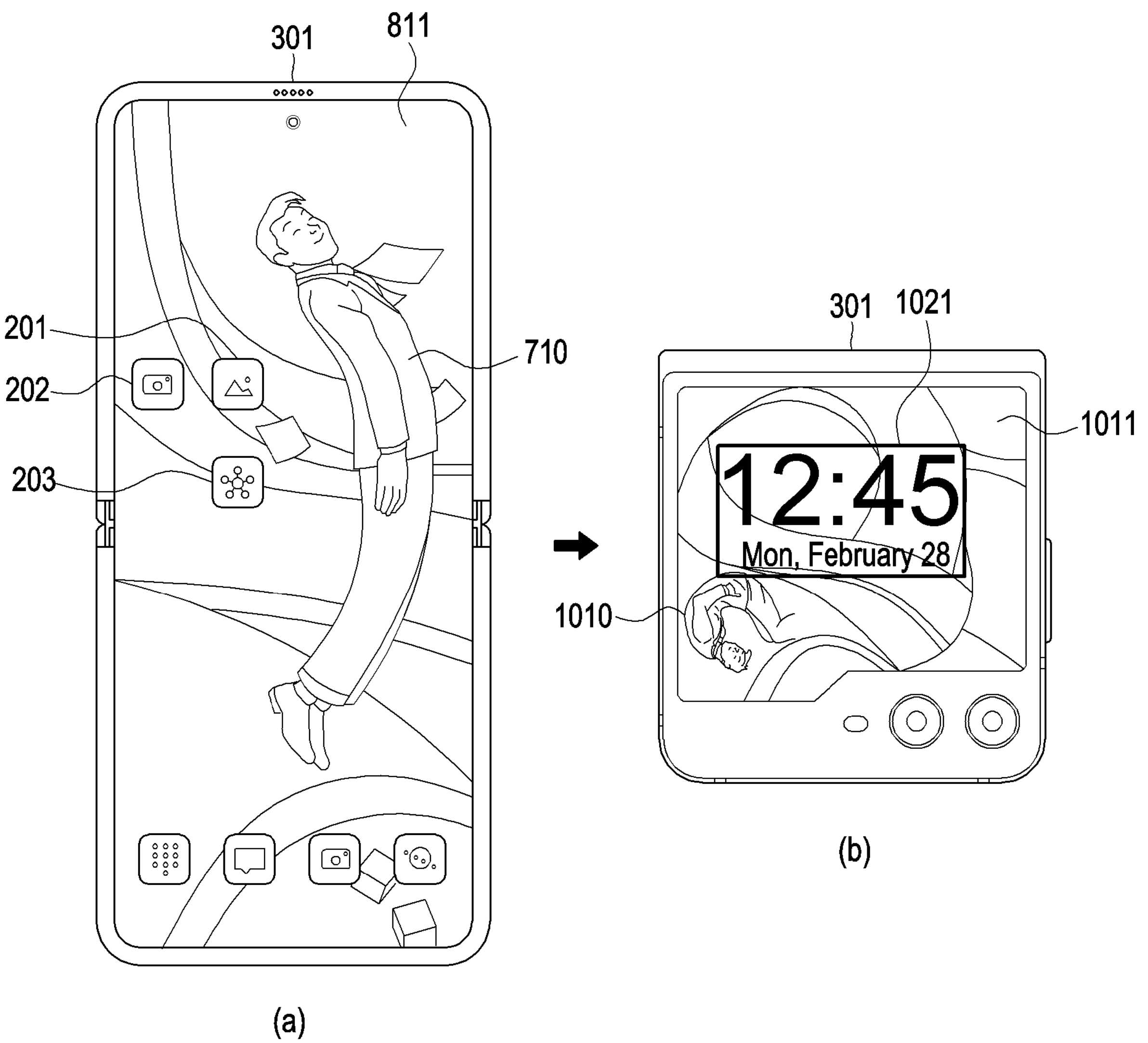
FIG. 10 is a diagram illustrating an operation for changing an object included in a background image by a first electronic device, when the object included in the background image is displayed overlapping a widget according to an embodiment of the disclosure.

FIG. 10 is a diagram illustrating an operation for changing an object included in a background image by a first electronic device, when a widget is displayed overlapping the object included in the background image according to an embodiment of the disclosure.

Referring to part (a) of FIG. 10, according to an embodiment, the first electronic device 301 (e.g., the first electronic device 301 in FIG. 3A) may display the first icon 201, the second icon 202, and the third icon 203 on the second background image 811 through the display 360 (e.g., the display 360 in FIG. 3A).

Referring to part (b) of FIG. 10, according to an embodiment, when the display 360 is implemented as a foldable display, the first electronic device 301 may change the aspect ratio and size of the second background image 811 when the display 360 is switched from an unfolded state to a folded state.

According to an embodiment, the first electronic device 301 may identify whether the second object 710 and a widget 1021 included in the second background image 811 are displayed overlapping. For example, the widget 1021 includes a widget related to a clock. However, this is an example, to which the widget 1021 may not be limited.

According to an embodiment, based on identifying that the second object 710 and the widget 1021 are displayed overlapping, the first electronic device 301 may identify a command to change at least one of the position, size, or shape of the second object 710 such that the widget 1021 is displayed without overlapping the second object 710.

According to an embodiment, the first electronic device 301 may obtain a fourth object 1010 in which the position, size, and shape of the second object 710 are changed, using the AI model 340 (e.g., the AI model 340 in FIG. 3B).

According to an embodiment, the first electronic device 301 may obtain a fourth background image 1011 in which the second object 710 is replaced with the fourth object 1010. According to an embodiment, the first electronic device 301 may display the fourth background image 1011 through the display 360. According to an embodiment, the first electronic device 301 may display the widget 1021 on the fourth background image 1011.

Figure 11:
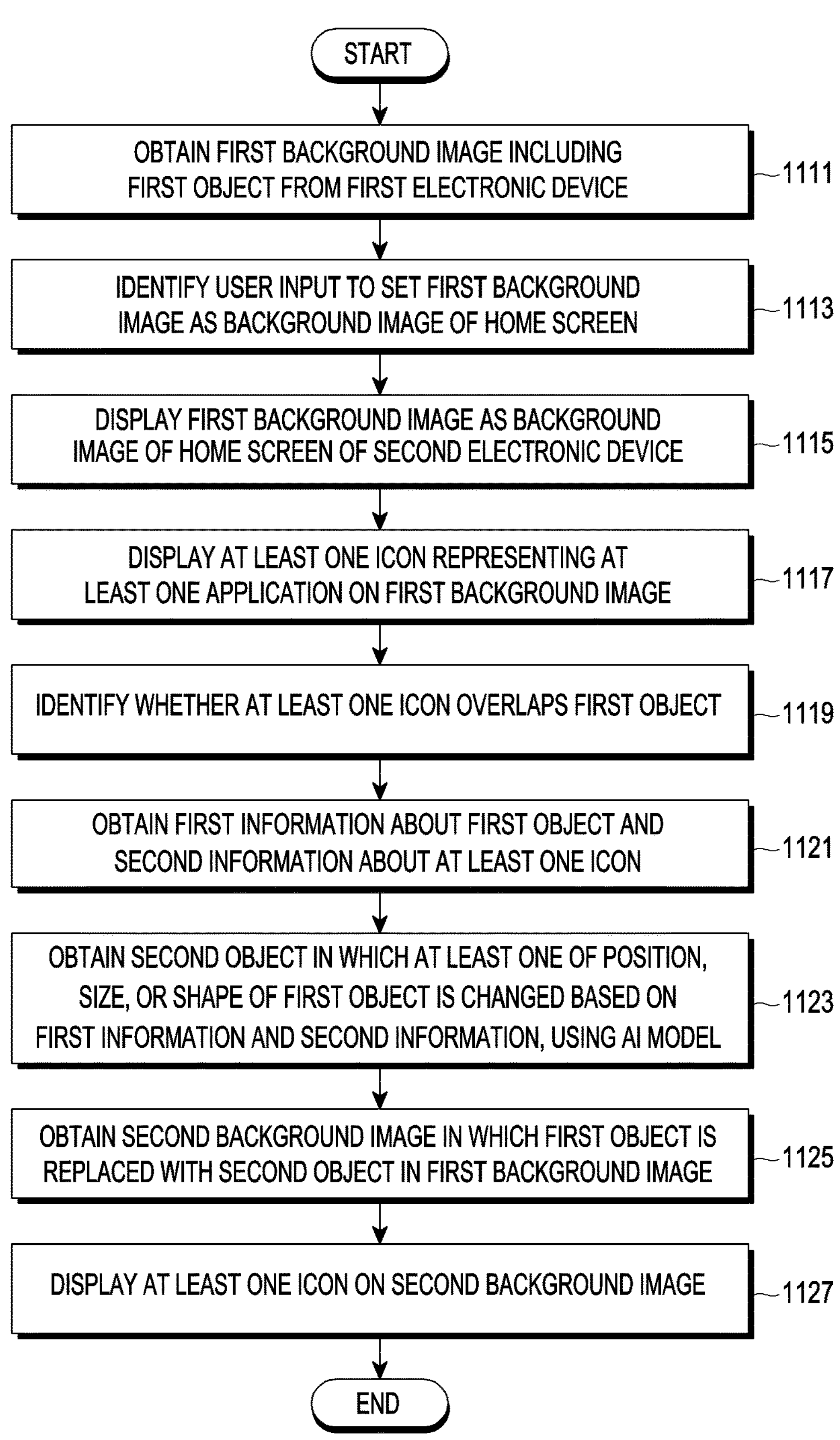
FIG. 11 is a flowchart illustrating an operation for obtaining a second background image by a second electronic device according to an embodiment of the disclosure.

FIG. 11 is a flowchart illustrating an operation for obtaining a second background image by a second electronic device according to an embodiment of the disclosure.

Referring to FIG. 11, according to an embodiment, in operation 1111, a second electronic device 1201 (e.g., a second electronic device 1201 in FIG. 12) may obtain a first background image including a first object from the first electronic device 301 (e.g., the first electronic device 301 in FIG. 3A) through a communication circuit.

According to an embodiment, in operation 1113, the second electronic device 1201 may identify a user input to set the first background image as a background image of a home screen. For example, the home screen includes a screen displayed by the first electronic device 301 when a user input to a home key provided by the first electronic device 301 is identified. For example, the home screen includes a screen which is displayed through the display 360 without displaying an execution screen of an application installed on the second electronic device 1201, when a lock screen of the second electronic device 1201 is unlocked.

According to an embodiment, in operation 1115, the second electronic device 1201 may display the first background image as the background image of the home screen of the second electronic device.

According to an embodiment, in operation 1117, the second electronic device 1201 may display at least one icon representing at least one application on the first background image.

According to an embodiment, in operation 1119, the second electronic device 1201 may identify whether the at least one icon and the first object are displayed overlapping.

According to an embodiment, in operation 1121, the second electronic device 1201 may obtain first information about the first object and second information about the at least one icon. For example, the first information includes information about at least one of the position, size, or shape of the first object. The second information includes, for example, information about at least one of the position, size, or shape of the at least one icon.

According to an embodiment, in operation 1123, the second electronic device 1201 may obtain a second object in which at least one of the position, size, or shape of the first object is changed based on the first information and the second information, using an AI model.

According to an embodiment, in operation 1125, the second electronic device 1201 may obtain a second background image in which the first object is replaced with the second object in the first background image.

According to an embodiment, in operation 1127, the second electronic device 1201 may display the at least one icon on the second background image.

According to an embodiment, the operations of the first electronic device 301 described with reference to FIGS. 1, 2, 3A, 3B, 4, 5A, 5B, 6, 7, 8A, 8B, 9, and 10 may be performed by the second electronic device 1201.

According to an embodiment, the first information about the first object and the second information about the at least one icon may be obtained between operation 1117 and operation 1119. That is, the second electronic device 1201 may identify whether the at least one icon and the first object are displayed overlapping, after obtaining the first information and the second information.

Figure 12:
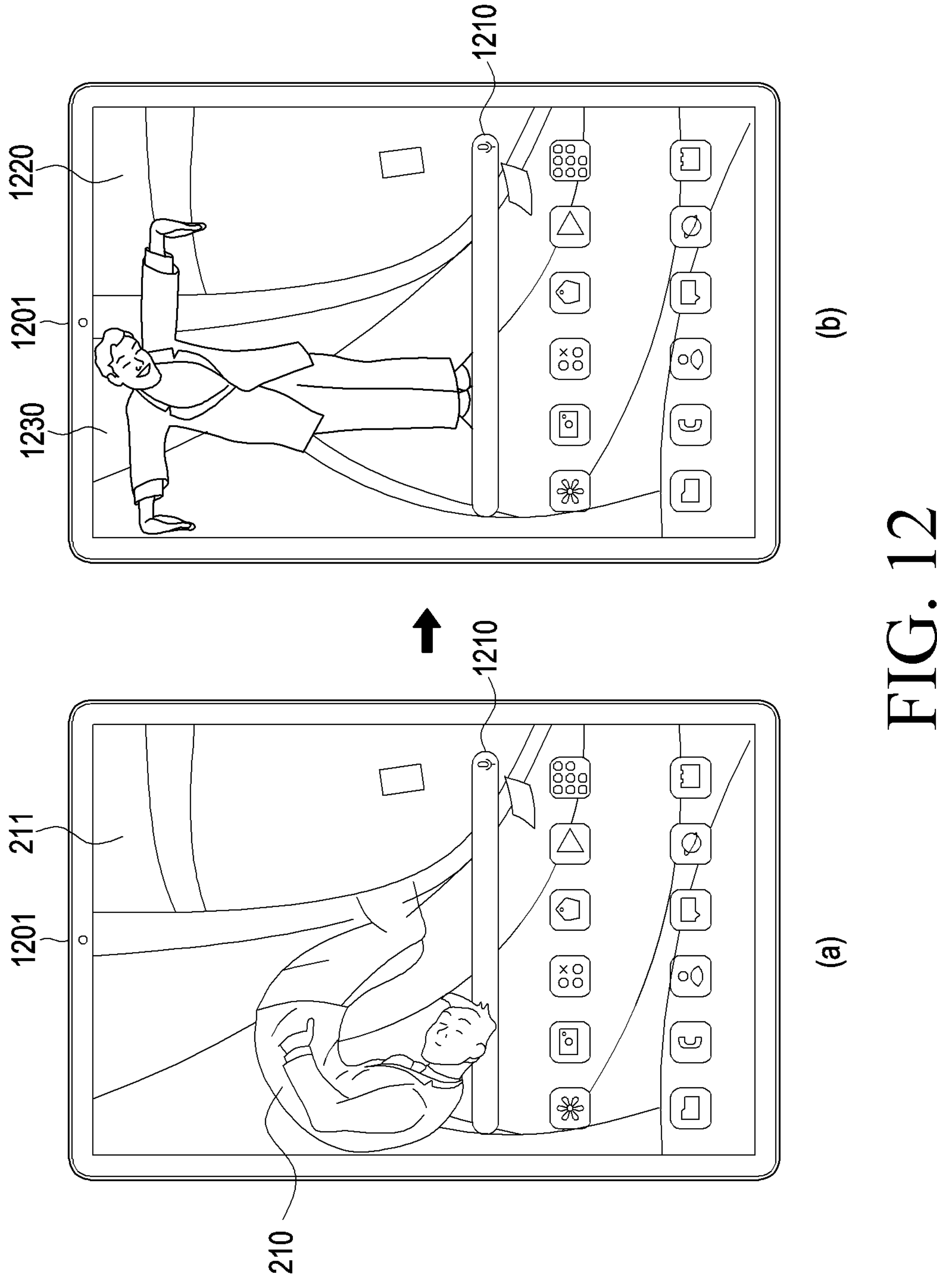
FIG. 12 is a diagram illustrating an operation for obtaining a second background image by a second electronic device according to an embodiment of the disclosure.

FIG. 12 is a diagram illustrating an operation for obtaining a second background image by a second electronic device according to an embodiment of the disclosure.

Referring to part (a) of FIG. 12, according to an embodiment, the second electronic device 1201 may display the first background image 211 including the first object 210 through the display. For example, the first background image 211 includes an image obtained through the first electronic device 301 (e.g., the first electronic device 301 in FIG. 3A).

According to an embodiment, the second electronic device 1201 may display a widget 1210 on the first background image 211.

According to an embodiment, the second electronic device 1201 may identify that the first object 210 and the widget 1210 are displayed overlapping based on the position of the first object 210 and the position of the widget 1210. According to an embodiment, based on identifying that the first object 210 and the widget 1210 are displayed overlapping, the second electronic device 1201 may change at least one of the position, size, or shape of the first object 210 such that the first object 210 and the widget 1210 do not overlap.

Referring to part (b) of FIG. 12, according to an embodiment, the second electronic device 1201 may obtain information about the first object 210 and information about the widget 1210. For example, the information about the first object 210 includes information about at least one of the position, size, or shape of the first object 210. According to an embodiment, the information about the widget 1210 may include information about at least one of the position, size, or shape of the widget 1210.

According to an embodiment, the second electronic device 1201 may obtain a fourth object 1230 based on the information about the first object 210 and the information about the widget 1210, using an AI model stored in memory of the second electronic device 1201. For example, the fourth object 1230 includes an object representing "a man in a T-shaped posture with his head facing upward, looking straight ahead and wearing a blue suit."

According to an embodiment, the second electronic device 1201 may display a fourth background image 1220 in which the first object 210 is replaced with the fourth object 1230 in the first background image 211.

According to an embodiment, the second electronic device 1201 may display the widget 1210 on the fourth background image 1220.

According to an embodiment, a display position of the fourth object 1230 may not overlap a display position of the widget 1210.

Figure 13:
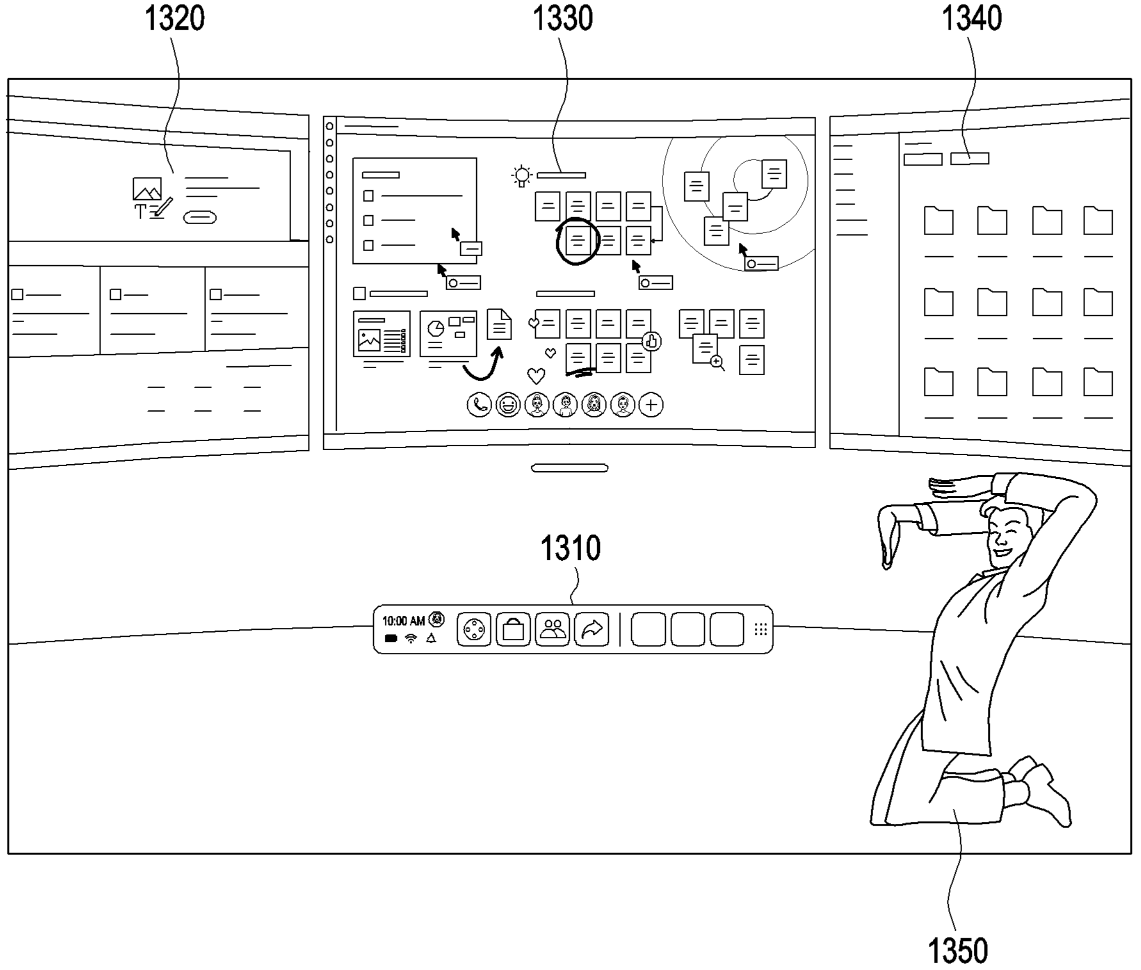
FIG. 13 is a diagram illustrating a screen displayed through a display, when a second electronic device is implemented as a video see through (VST) device according to an embodiment of the disclosure.

FIG. 13 is a diagram illustrating a screen displayed through a display, when a second electronic device is implemented as a video see through (VST) device according to an embodiment of the disclosure.

Referring to FIG. 13, according to an embodiment, the second electronic device 1201 (e.g., the second electronic device 1201 in FIG. 11) may be implemented as a VST device.

According to an embodiment, the second electronic device 1201 may display virtual objects 1310, 1320, 1330, and 1340 through a display.

According to an embodiment, the second electronic device 1201 may obtain the first background image 211 (e.g., the first background image 211 in FIG. 2) including the first object 210 (e.g., the first object 210 in FIG. 2) from the first electronic device 301 (e.g., the first electronic device 301 in FIG. 3A).

According to an embodiment, the second electronic device 1201 may identify a user input to display the first object 210 (e.g., the first object 210 in FIG. 2) included in the first background image 211.

According to an embodiment, when the first object 210 is displayed through the display 360, the second electronic device 1201 may identify whether at least one of the virtual objects 1310, 1320, 1330, and 1340 is displayed overlapping the first object 210.

According to an embodiment, the second electronic device 1201 may change at least one of the position, size, or shape of the first object 210 such that the first object 210 is displayed without overlapping the virtual objects 1310, 1320, 1330, and 1340.

According to an embodiment, the second electronic device 1201 may obtain a fifth object 1350 in which at least one of the position, size, or shape of the first object 210 is changed.

According to an embodiment, the second electronic device 1201 may display the fifth object 1350. According to an embodiment, the fifth object 1350 may be displayed without overlapping the virtual objects 1310, 1320, 1330, and 1340.

According to an embodiment, a first electronic device (e.g., 301 in FIG. 3A) may include a display (e.g., 360 in FIG. 3A), memory (e.g., 310 in FIG. 3A), and at least one processor (e.g., 320 in FIG. 3A).

According to an embodiment, wherein the instructions, when executed by the at least one processor individually or collectively, cause the first electronic device to, display, through the display, a first background image (e.g., 211 in FIG. 8A) including a first object (e.g., 210 in FIG. 8A), and at least one indicator (e.g., 201, 202, and 203 in FIG. 8A) for executing at least one application of the first electronic device on the first background image.

According to an embodiment, wherein the instructions, when executed by the at least one processor individually or collectively, cause the first electronic device to, identify whether the first object overlaps the at least one indicator.

According to an embodiment wherein the instructions, when executed by the at least one processor individually or collectively, cause the first electronic device to, based on identifying that the first object overlaps the at least one indicator, obtain a command to change at least one of a position, a size, or a shape of the first object.

According to an embodiment, wherein the instructions, when executed by the at least one processor individually or collectively, cause the first electronic device to, based on providing first information about the first object and second information about the at least one indicator to an artificial intelligence model (340), obtain a second object in which at least one of the position, the size, or the shape of the first object is changed in consideration of a position of the at least one indicator.

According to an embodiment, wherein the instructions, when executed by the at least one processor individually or collectively, cause the first electronic device to, obtain a second background image (e.g., 811 in FIG. 8A) in which the first object of the first background image is replaced with the second object (e.g., 710 in FIG. 8A).

According to an embodiment, wherein the instructions, when executed by the at least one processor individually or collectively, cause the first electronic device to, display, through the display, the at least one indicator on the second background image, wherein the at least one indicator does not overlap the second object.

According to an embodiment, wherein the instructions, when executed by the at least one processor individually or collectively, cause the first electronic device to, identify at least one position of the at least one indicator and the position of the first object.

According to an embodiment, wherein the instructions, when executed by the at least one processor individually or collectively, cause the first electronic device to, based on the at least one position of the at least one indicator and the position of the first object, identify whether the at least one indicator overlaps the first object.

According to an embodiment, wherein the instructions, when executed by the at least one processor individually or collectively, cause the first electronic device to, obtain the second object based on a size of the first background image displayed on the display, the at least one position of the at least one indicator, and the position of the first object.

According to an embodiment, wherein the instructions, when executed by the at least one processor individually or collectively, cause the first electronic device to, when a position of a first indicator among the at least one indicator changes, identify whether the first indicator overlaps the first object.

According to an embodiment, wherein the instructions, when executed by the at least one processor individually or collectively, cause the first electronic device to, based on identifying that the first indicator overlaps the first object, obtain the command.

According to an embodiment, wherein the instructions, when executed by the at least one processor individually or collectively, cause the first electronic device to, when an aspect ratio of the first background image displayed on the display changes, identify whether the at least one indicator overlaps the first object.

According to an embodiment, wherein the instructions, when executed by the at least one processor individually or collectively, cause the first electronic device to, based on identifying that the at least one indicator overlaps the first object, obtain the command.

According to an embodiment, wherein the instructions, when executed by the at least one processor individually or collectively, cause the first electronic device to, when at least one of a size of the first background image or a ratio of the first background image displayed on the display changes as a display area of the display expands or contracts, identify whether the at least one indicator overlaps the first object.

According to an embodiment, wherein the instructions, when executed by the at least one processor individually or collectively, cause the first electronic device to, based on identifying that the at least one indicator overlaps the first object, obtain the command.

According to an embodiment, wherein the instructions, when executed by the at least one processor individually or collectively, cause the first electronic device to, when identifying a user's text input to change at least one of the position, the size, or the shape of the first object, obtain the command.

According to an embodiment, the first background image may be an image displayed on a home screen of the first electronic device.

According to an embodiment, a method for operating a first electronic device may include displaying, through a display included in the first electronic device, a first background image including a first object, and at least one indicator for executing at least one application of the first electronic device on the first background image.

According to an embodiment, the method for operating the first electronic device may include, based on identifying whether the first object overlaps the at least one indicator, obtaining a command to change at least one of a position, a size, or a shape of the first object.

According to an embodiment, the method for operating the first electronic device may include identifying whether the first object overlaps the at least one indicator.

According to an embodiment, the method for operating the first electronic device may include, based on identifying that the first object overlaps the at least one indicator, obtaining a command to change at least one of a position, a size, or a shape of the first object.

According to an embodiment, the method for operating the first electronic device may include obtaining first information about the first object and second information about the at least one indicator.

According to an embodiment, the method for operating the first electronic device may include, based on providing first information about the first object and second information about the at least one indicator to an artificial intelligence model (340), obtaining a second object in which at least one of the position, the size, or the shape of the first object is changed in consideration of a position of the at least one indicator.

According to an embodiment, the method for operating the first electronic device may include obtaining a second background image in which the first object of the first background image is replaced with the second object.

According to an embodiment, the method for operating the first electronic device may include displaying, through the display, the at least one indicator on the second background image, and the at least one indicator may not overlap the second object.

According to an embodiment, the method for operating the first electronic device may include identifying at least one position of the at least one indicator and the position of the first object.

According to an embodiment, the method for operating the first electronic device may include, based on the at least one position of the at least one indicator and the position of the first object, identifying whether the at least one indicator overlaps the first object.

According to an embodiment, the method for operating the first electronic device may include obtaining the second object based on a size of the first background image displayed on the display, the at least one position of the at least one indicator, and the position of the first object.

According to an embodiment, the method for operating the first electronic device may include, when a position of a first indicator among the at least one indicator changes, identifying whether the first indicator overlaps the first object.

According to an embodiment, the method for operating the first electronic device may include, based on identifying that the first indicator overlaps the first object, obtaining the command.

According to an embodiment, the method for operating the first electronic device may include, when an aspect ratio of the first background image displayed on the display changes, identifying whether the at least one indicator overlaps the first object.

According to an embodiment, the method for operating the first electronic device may include, based on identifying that the at least one indicator overlaps the first object, obtaining the command.

According to an embodiment, the method for operating the first electronic device may include, when at least one of a size of the first background image or a ratio of the first background image displayed on the display changes as a display area of the display expands or contracts, identifying whether the at least one indicator overlaps the first object.

According to an embodiment, the method for operating the first electronic device may include, based on identifying that the at least one indicator overlaps the first object, obtaining the command.

According to an embodiment, the method for operating the first electronic device may include, when identifying a user's text input to change at least one of the position, the size, or the shape of the first object, obtaining the command.

According to an embodiment, the first background image may be an image displayed on a home screen of the first electronic device.

According to an embodiment, a non-transitory computer-readable storage medium may store at least one instruction configured to, when executed by a processor of a first electronic device, enable the first electronic device to display, through a display included in the first electronic device, a first background image including a first object, and at least one indicator for executing at least one application of the first electronic device on the first background image.

According to an embodiment, the non-transitory computer-readable storage medium may store at least one instruction configured to, when executed by the processor of the first electronic device, enable the first electronic device to identify whether the first object overlaps the at least one indicator.

According to an embodiment, the non-transitory computer-readable storage medium may store at least one instruction configured to, when executed by the processor of the first electronic device, enable the first electronic device to, based on identifying that the first object overlaps the at least one indicator, obtain a command to change at least one of a position, a size, or a shape of the first object.

According to an embodiment, the non-transitory computer-readable storage medium may store at least one instruction configured to, when executed by the processor of the first electronic device, enable the first electronic device to obtain first information about the first object and second information about the at least one indicator.

According to an embodiment, the non-transitory computer-readable storage medium may store at least one instruction configured to, when executed by the processor of the first electronic device, enable the first electronic device to, based on providing first information about the first object and second information about the at least one indicator to an artificial intelligence model (340), obtain a second object in which at least one of the position, the size, or the shape of the first object is changed in consideration of a position of the at least one indicator.

According to an embodiment, the non-transitory computer-readable storage medium may store at least one instruction configured to, when executed by the processor of the first electronic device, enable the first electronic device to obtain a second background image in which the first object of the first background image is replaced with the second object.

According to an embodiment, the non-transitory computer-readable storage medium may store at least one instruction configured to, when executed by the processor of the first electronic device, enable the first electronic device to display, through the display, the at least one indicator on the second background image, and the at least one indicator may not overlap the second object.

According to an embodiment, the non-transitory computer-readable storage medium may store at least one instruction configured to, when executed by the processor of the first electronic device, enable the first electronic device to identify at least one position of the at least one indicator and the position of the first object.

According to an embodiment, the non-transitory computer-readable storage medium may store at least one instruction configured to, when executed by the processor of the first electronic device, enable the first electronic device to, based on the at least one position of the at least one indicator and the position of the first object, identify whether the at least one indicator overlaps the first object.

According to an embodiment, the non-transitory computer-readable storage medium may store at least one instruction configured to, when executed by the processor of the first electronic device, enable the first electronic device to obtain the second object based on a size of the first background image displayed on the display, the at least one position of the at least one indicator, and the position of the first object.

According to an embodiment, the non-transitory computer-readable storage medium may store at least one instruction configured to, when executed by the processor of the first electronic device, enable the first electronic device to, when a position of a first indicator among the at least one indicator changes, identify whether the first indicator overlaps the first object.

According to an embodiment, the non-transitory computer-readable storage medium may store at least one instruction configured to, when executed by the processor of the first electronic device, enable the first electronic device to, based on identifying that the first indicator overlaps the first object, obtain the command.

According to an embodiment, the non-transitory computer-readable storage medium may store at least one instruction configured to, when executed by the processor of the first electronic device, enable the first electronic device to, when an aspect ratio of the first background image displayed on the display changes, identify whether the at least one indicator overlaps the first object.

According to an embodiment, the non-transitory computer-readable storage medium may store at least one instruction configured to, when executed by the processor of the first electronic device, enable the first electronic device to, based on identifying that the at least one indicator overlaps the first object, obtain the command.

According to an embodiment, the non-transitory computer-readable storage medium may store at least one instruction configured to, when executed by the processor of the first electronic device, enable the first electronic device to, when at least one of a size of the first background image or a ratio of the first background image displayed on the display changes as a display area of the display expands or contracts, identify whether the at least one indicator overlaps the first object.

According to an embodiment, the non-transitory computer-readable storage medium may store at least one instruction configured to, when executed by the processor of the first electronic device, enable the first electronic device to, based on identifying that the at least one indicator overlaps the first object, obtain the command.

According to an embodiment, the non-transitory computer-readable storage medium may store at least one instruction configured to, when executed by the processor of the first electronic device, enable the first electronic device to, when identifying a user's text input to change at least one of the position, the size, or the shape of the first object, obtain the command.

According to an embodiment, the first background image may be an image displayed on a home screen of the first electronic device.

According to an embodiment, a second electronic device may include a communication circuit, a display, memory, and at least one processor.

According to an embodiment, wherein the instructions, when executed by the at least one processor individually or collectively, cause the second electronic device to, obtain a first background image including a first object from a first electronic device through the communication circuit.

According to an embodiment, wherein the instructions, when executed by the at least one processor individually or collectively, cause the second electronic device to, based on a user input to set the first background image as a background image of a home screen of the second electronic device, display the first background image as the background image of the home screen of the second electronic device.

According to an embodiment, wherein the instructions, when executed by the at least one processor individually or collectively, cause the second electronic device to, display at least one indicator for executing at least one application of the second electronic device on the first background image.

According to an embodiment, wherein the instructions, when executed by the at least one processor individually or collectively, cause the second electronic device to, identify whether the first object overlaps the at least one indicator.

According to an embodiment, wherein the instructions, when executed by the at least one processor individually or collectively, cause the second electronic device to, based on identifying that the first object overlaps the at least one indicator, obtain a command to change at least one of a position, a size, or a shape of the first object.

According to an embodiment, wherein the instructions, when executed by the at least one processor individually or collectively, cause the second electronic device to, obtain first information about the first object and second information about the at least one indicator.

According to an embodiment, wherein the instructions, when executed by the at least one processor individually or collectively, cause the second electronic device to, based on providing first information about the first object and second information about the at least one indicator to an artificial intelligence model, obtain a second object in which at least one of the position, the size, or the shape of the first object is changed in consideration of a position of the at least one indicator.

According to an embodiment, wherein the instructions, when executed by the at least one processor individually or collectively, cause the second electronic device to, obtain a second background image in which the first object of the first background image is replaced with the second object.

According to an embodiment, wherein the instructions, when executed by the at least one processor individually or collectively, cause the second electronic device to, display, through the display, the at least one indicator on the second background image, wherein the at least one indicator does not overlap the second object.

According to an embodiment, a method for operating a second electronic device may include obtaining a first background image including a first object from a first electronic device through a communication circuit of the second electronic device.

According to an embodiment, the method for operating the second electronic device may include, based on a user input to set the first background image as a background image of a home screen of the second electronic device, displaying the first background image as the background image of the home screen of the second electronic device.

According to an embodiment, the method for operating the second electronic device may include displaying at least one indicator for executing at least one application of the second electronic device on the first background image.

According to an embodiment, the method for operating the second electronic device may include identifying whether the first object overlaps the at least one indicator.

According to an embodiment, the method for operating the second electronic device may include, based on identifying that the first object overlaps the at least one indicator, obtaining a command to change at least one of a position, a size, or a shape of the first object.

According to an embodiment, the method for operating the second electronic device may include obtaining first information about the first object and second information about at least one indicator.

According to an embodiment, the method for operating the second electronic device may include, based on providing first information about the first object and second information about the at least one indicator to an artificial intelligence model, obtaining a second object in which at least one of the position, the size, or the shape of the first object is changed in consideration of a position of the at least one indicator.

According to an embodiment, the method for operating the second electronic device may include obtaining a second background image in which the first object of the first background image is replaced with the second object.

According to an embodiment, the method for operating the second electronic device may include displaying, through the display, the at least one indicator on the second background image, and the at least one indicator may not overlap the second object.

According to an embodiment, a non-transitory computer-readable storage medium may store at least one instruction configured to, when executed by a processor of a second electronic device, enable the second electronic device to obtain a first background image including a first object from a first electronic device through a communication circuit of the second electronic device.

According to an embodiment, the non-transitory computer-readable storage medium may store at least one instruction configured to, when executed by the processor of the second electronic device, enable the second electronic device to, based on a user input to set the first background image as a background image of a home screen of the second electronic device, display the first background image as the background image of the home screen of the second electronic device.

According to an embodiment, the non-transitory computer-readable storage medium may store at least one instruction configured to, when executed by the processor of the second electronic device, enable the second electronic device to display at least one indicator for executing at least one application of the second electronic device on the first background image.

According to an embodiment, the non-transitory computer-readable storage medium may store at least one instruction configured to, when executed by the processor of the second electronic device, enable the second electronic device to identify whether the first object overlaps the at least one indicator.

According to an embodiment, the non-transitory computer-readable storage medium may store at least one instruction configured to, when executed by the processor of the second electronic device, enable the second electronic device to, based on identifying that the first object overlaps the at least one indicator, obtain a command to change at least one of a position, a size, or a shape of the first object.

According to an embodiment, the non-transitory computer-readable storage medium may store at least one instruction configured to, when executed by the processor of the second electronic device, enable the second electronic device to obtain first information about the first object and second information about at least one indicator.

According to an embodiment, the non-transitory computer-readable storage medium may store at least one instruction configured to, when executed by the processor of the second electronic device, enable the second electronic device to, based on providing first information about the first object and second information about the at least one indicator to an artificial intelligence model, obtain a second object in which at least one of the position, the size, or the shape of the first object is changed in consideration of a position of the at least one indicator.

According to an embodiment, the non-transitory computer-readable storage medium may store at least one instruction configured to, when executed by the processor of the second electronic device, enable the second electronic device to obtain a second background image in which the first object of the first background image is replaced with the second object.

According to an embodiment, the non-transitory computer-readable storage medium may store at least one instruction configured to, when executed by the processor of the second electronic device, enable the second electronic device to display, through the display, the at least one indicator on the second background image, wherein the at least one indicator does not overlap the second object.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101 or 301). For example, a processor (e.g., the processor 120 or 320) of the machine (e.g., the electronic device 101 or 301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A first electronic device comprising:

a display;

memory storing one or more computer programs; and one or more processors communicatively coupled to the display and the memory, wherein the one or more computer programs include computer-executable instructions that, when executed by the one or more processors individually or collectively, cause the first electronic device to:

display, through the display, a first background image including a first object, and at least one indicator for executing at least one application of the first electronic device on the first background image, identify whether the first object overlaps the at least one indicator, based on identifying that the first object overlaps the at least one indicator, obtain a command to change at least one of a position, a size, or a shape of the first object, based on providing first information about the first object and second information about the at least one indicator to an artificial intelligence model, obtain a second object in which at least one of the position, the size, or the shape of the first object is changed in consideration of a position of the at least one indicator, obtain a second background image in which the first object of the first background image is replaced with the second object, and display, through the display, the at least one indicator on the second background image, wherein the at least one indicator does not overlap the second object.

2. The first electronic device of claim 1, wherein the one or more computer programs further include computer-executable instructions that, when executed by the one or more processors individually or collectively, cause the first electronic device to:

identify at least one position of the at least one indicator and the position of the first object, and based on the at least one position of the at least one indicator and the position of the first object, identify whether the at least one indicator overlaps the first object.

3. The first electronic device of claim 2, wherein the one or more computer programs further include computer-executable instructions that, when executed by the one or more processors individually or collectively, cause the first electronic device to:

based on a size of the first background image displayed on the display, the at least one position of the at least one indicator, and the position of the first object, obtain the second object.

4. The first electronic device of claim 3, wherein the one or more computer programs further include computer-executable instructions that, when executed by the one or more processors individually or collectively, cause the first electronic device to:

when a position of a first indicator among the at least one indicator changes, identify whether the first indicator overlaps the first object, and based on identifying that the first indicator overlaps the first object, obtain the command.

5. The first electronic device of claim 4, wherein the one or more computer programs further include computer-executable instructions that, when executed by the one or more processors individually or collectively, cause the first electronic device to:

when an aspect ratio of the first background image displayed on the display changes, identify whether the at least one indicator overlaps the first object, and based on identifying that the at least one indicator overlaps the first object, obtain the command.

6. The first electronic device of claim 5, wherein the one or more computer programs further include computer-executable instructions that, when executed by the one or more processors individually or collectively, cause the first electronic device to:

when at least one of a size of the first background image or a ratio of the first background image displayed on the display changes as a display area of the display expands or contracts, identify whether the at least one indicator overlaps the first object, and based on identifying that the at least one indicator overlaps the first object, obtain the command.

7. The first electronic device of claim 6, wherein the one or more computer programs further include computer-executable instructions that, when executed by the one or more processors individually or collectively, cause the first electronic device to:

when identifying a user's text input to change at least one of the position, the size, or the shape of the first object, obtain the command.

8. The first electronic device of claim 7, wherein the first background image is an image displayed on a home screen of the first electronic device.

9. A non-transitory storage medium storing one or more program, the one or more program comprising computer-executable instructions, when executed by at least one processor a first electronic device, cause the first electronic device to:

display, through a display included in the first electronic device, a first background image including a first object, and at least one indicator for executing at least one application of the first electronic device on the first background image;

identify whether the first object overlaps the at least one indicator;

based on identifying that the first object overlaps the at least one indicator, obtain a command to change at least one of a position, a size, or a shape of the first object;

based on providing first information about the first object and second information about the at least one indicator to an artificial intelligence model, obtain a second object in which at least one of the position, the size, or the shape of the first object is changed in consideration of a position of the at least one indicator;

obtain a second background image in which the first object of the first background image is replaced with the second object; and display, through the display, the at least one indicator on the second background image, wherein the at least one indicator does not overlap the second object.

10. The non-transitory storage medium of claim 9, wherein the instructions cause the first electronic device to:

identify at least one position of the at least one indicator and the position of the first object; and based on the at least one position of the at least one indicator and the position of the first object, identify whether the at least one indicator overlaps the first object.

11. The non-transitory storage medium of claim 10, wherein obtaining a second object in which at least one of the position, the size, or the shape of the first object is changed, comprises based on a size of the first background image displayed on the display, the at least one position of the at least one indicator, and the position of the first object, obtaining the second object.

12. The non-transitory storage medium of claim 11, wherein the instructions cause the first electronic device to:

when a position of a first indicator among the at least one indicator changes, identify whether the first indicator overlaps the first object; and based on identifying that the first indicator overlaps the first object, obtain the command.

13. The non-transitory storage medium of claim 12, wherein the instructions cause the first electronic device to:

when an aspect ratio of the first background image displayed on the display changes, identify whether the at least one indicator overlaps the first object; and based on identifying that the at least one indicator overlaps the first object, obtain the command.

14. The non-transitory storage medium of claim 13, wherein the instructions cause the first electronic device to:

when at least one of a size of the first background image or a ratio of the first background image displayed on the display changes as a display area of the display expands or contracts, identify whether the at least one indicator overlaps the first object; and based on identifying that the at least one indicator overlaps the first object, obtain the command.

15. The non-transitory storage medium of claim 14, wherein the instructions cause the first electronic device to, when identifying a user's text input to change at least one of the position, the size, or the shape of the first object, obtain the command.

16. The non-transitory storage medium of claim 15, wherein the first background image is an image displayed on a home screen of the first electronic device.

17. A second electronic device comprising:

communication circuitry;

a display;

memory storing one or more computer programs; and one or more processors communicatively coupled to the communication circuitry, the display, and the memory, wherein the one or more computer programs include computer-executable instructions that, when executed by the one or more processors individually or collectively, cause the second electronic device to:

obtain, through the communication circuitry, a first background image including a first object from a first electronic device, based on a user input to set the first background image as a background image of a home screen of the second electronic device, display the first background image as the background image of the home screen of the second electronic device, display at least one indicator for executing at least one application of the second electronic device on the first background image, identify whether the first object overlaps the at least one indicator, based on identifying that the first object overlaps the at least one indicator, obtain a command to change at least one of a position, a size, or a shape of the first object, based on providing first information about the first object and second information about the at least one indicator to an artificial intelligence model, obtain a second object in which at least one of the position, the size, or the shape of the first object is changed in consideration of a position of the at least one indicator, obtain a second background image in which the first object of the first background image is replaced with the second object, and display, through the display, the at least one indicator on the second background image, wherein the at least one indicator does not overlap the second object.

18. The second electronic device of claim 17, wherein the one or more computer programs further include computer-executable instructions that, when executed by the one or more processors individually or collectively, cause the first electronic device to:

identify at least one position of the at least one indicator and the position of the first object, and based on the at least one position of the at least one indicator and the position of the first object, identify whether the at least one indicator overlaps the first object.

19. The second electronic device of claim 18, wherein the one or more computer programs further include computer-executable instructions that, when executed by the one or more processors individually or collectively, cause the first electronic device to:

obtain the second object based on a size of the first background image displayed on the display, the at least one position of the at least one indicator, and the position of the first object.

20. The second electronic device of claim 19, wherein the one or more computer programs further include computer-executable instructions that, when executed by the one or more processors individually or collectively, cause the first electronic device to:

when a position of a first indicator among the at least one indicator changes, identify whether the first indicator overlaps the first object, and based on identifying that the first indicator overlaps the first object, obtain the command.

* * * * *